United States Patent
Tseng et al.

(10) Patent No.: US 7,143,308 B2
(45) Date of Patent: Nov. 28, 2006

(54) APPARATUS, SYSTEM, AND METHOD FOR DIFFERENTIAL REBUILDING OF A REACTIVATED OFFLINE RAID MEMBER DISK

(76) Inventors: Charlie Tseng, 21911 Lone Oak Cir., San Jose, CA (US) 95120; Kern S. Bhugra, 2890 Zanker Rd., San Jose, CA (US) 95134

( * ) Notice: Subject to any disclaimer, the term of this patent is extended or adjusted under 35 U.S.C. 154(b) by 58 days.

(21) Appl. No.: 11/035,860

(22) Filed: Jan. 14, 2005

(65) Prior Publication Data

US 2006/0161805 A1 Jul. 20, 2006

(51) Int. Cl.
*G06F 11/00* (2006.01)
(52) U.S. Cl. .............................. 714/6; 714/7
(58) Field of Classification Search .................... 714/6, 714/7
See application file for complete search history.

(56) References Cited

U.S. PATENT DOCUMENTS

| | | | | |
|---|---|---|---|---|
| 5,390,187 A | * | 2/1995 | Stallmo | 714/7 |
| 5,526,482 A | * | 6/1996 | Stallmo et al. | 714/6 |
| 5,617,530 A | * | 4/1997 | Stallmo et al. | 714/6 |
| 5,701,406 A | * | 12/1997 | Matsumoto et al. | 714/6 |
| 5,708,668 A | * | 1/1998 | Styczinski | 714/6 |
| 6,715,048 B1 | * | 3/2004 | Kamvysselis | 711/162 |
| 6,732,290 B1 | * | 5/2004 | Perry et al. | 714/6 |
| 6,820,211 B1 | * | 11/2004 | Kalman | 714/6 |
| 2003/0037281 A1 | * | 2/2003 | Hitz et al. | 714/6 |
| 2003/0120863 A1 | * | 6/2003 | Lee et al. | 711/114 |
| 2004/0078637 A1 | * | 4/2004 | Fellin et al. | 714/6 |
| 2005/0060505 A1 | * | 3/2005 | Kasako et al. | 711/162 |
| 2005/0210318 A1 | * | 9/2005 | Marks et al. | 714/7 |

* cited by examiner

Primary Examiner—Bryce P. Bonzo

(57) ABSTRACT

An apparatus, system, and method are disclosed for rebuilding only changed stripes of an offline member disk in a RAID array that is configured with redundancy and no hot standby disk. A work-in-progress ("WIP") map tracks the changed stripes of the offline member disk prior to a reactivation and records the completion of the differential rebuilding ("DR") process on the stripes. The DR process shortens the duration of a degraded mode of operation entered into by a logical drive formed when the RAID array experiences a member disk failure that results in one member disk being designated as offline.

37 Claims, 12 Drawing Sheets

100a

160a

| Stripe Group No. | Member Disk 1 110a | Member Disk 2 110b | Member Disk 3 110c | Member Disk 4 110d |
|---|---|---|---|---|
| 0 | Data Stripe 0 | Data Stripe 1 | Data Stripe 2 | Data Stripe 3 |
| 1 | Data Stripe 4 | Data Stripe 5 | Data Stripe 6 | Data Stripe 7 |
| 2 | Data Stripe 8 | Data Stripe 9 | Data Stripe A | Data Stripe B |
| 3 | Data Stripe C | Data Stripe D | Data Stripe E | Data Stripe F |
| 4 | Data Stripe 10 | Data Stripe 11 | Data Stripe 12 | Data Stripe 13 |

| Stripe Group No. | Member Disk 1 110a | Member Disk 2 110b | Member Disk 3 110c | Member Disk 4 110d |
|---|---|---|---|---|
| 0 | Data Stripe 0 | Data Stripe 1 | Data Stripe 2 | Parity Stripe $P_0$ |
| 1 | Data Stripe 3 | Data Stripe 4 | Parity Stripe $P_1$ | Data Stripe 5 |
| 2 | Data Stripe 6 | Parity Stripe $P_2$ | Data Stripe 7 | Data Stripe 8 |
| 3 | Parity Stripe $P_3$ | Data Stripe 9 | Data Stripe A | Data Stripe B |
| 4 | Data Stripe C | Data Stripe D | Data Stripe E | Parity Stripe $P_4$ |

| Stripe Group No. | Member Disk 1 110a | Member Disk 2 110b |
|---|---|---|
| 0 | Data Stripe 0 | Data Stripe 0 |
| 1 | Data Stripe 1 | Data Stripe 1 |
| 2 | Data Stripe 2 | Data Stripe 2 |
| 3 | Data Stripe 3 | Data Stripe 3 |
| 4 | Data Stripe 4 | Data Stripe 4 |

| Stripe Group No. | Member Disk 1 110a | Member Disk 2 110b | Member Disk 3 110c | Member Disk 4 110d | WIP Map 315 |
|---|---|---|---|---|---|
| 0 | Data Stripe 0 | Data Stripe 1 | Data Stripe 2 | Parity Stripe $P_0$ | 1 |
| 1 | Data Stripe 3 | Data Stripe 4 | Parity Stripe $P_1$ | Data Stripe 5 | 1 |
| 2 | Data Stripe 6 | Parity Stripe $P_2$ | Data Stripe 7 | Data Stripe 8 | 1 |
| 3 | Parity Stripe $P_3$ | Data Stripe 9 | Data Stripe A | Data Stripe B | 1 |
| 4 | Data Stripe C | Data Stripe D | Data Stripe E | Parity Stripe $P_4$ | 1 |

FIG. 6b

Offline Disk 670

| Stripe Group No. | Member Disk 1 110a | Member Disk 2 110b | Member Disk 3 110c | Member Disk 4 110d | WIP Map 315 |
|---|---|---|---|---|---|
| 0 | Data Stripe 0 | Data Stripe 1 | Data Stripe 2 | Parity Stripe $P_0$ | 0 |
| 1 | Data Stripe 3 | Data Stripe 4 | Parity Stripe $P_1$ | Data Stripe 5 | 1 |
| 2 | Data Stripe 6 | Parity Stripe $P_2$ | Data Stripe 7 | Data Stripe 8 | 0 |
| 3 | Parity Stripe $P_3$ | Data Stripe 9 | Data Stripe A | Data Stripe B | 1 |
| 4 | Data Stripe C | Data Stripe D | Data Stripe E | Parity Stripe $P_4$ | 1 |

FIG. 6c

Disk Reactivated Online

| Stripe Group No. | Member Disk 1 110a | Member Disk 2 110b | Member Disk 3 110c | Member Disk 4 110d | WIP Map 315 |
|---|---|---|---|---|---|
| 0 | Data Stripe 0 | Data Stripe 1 | Data Stripe 2 | Parity Stripe $P_0$ | 1 |
| 1 | Data Stripe 3 | Data Stripe 4 | Parity Stripe $P_1$ | Data Stripe 5 | 1 |
| 2 | Data Stripe 6 | Parity Stripe $P_2$ | Data Stripe 7 | Data Stripe 8 | 1 |
| 3 | Parity Stripe $P_3$ | Data Stripe 9 | Data Stripe A | Data Stripe B | 1 |
| 4 | Data Stripe C | Data Stripe D | Data Stripe E | Parity Stripe $P_4$ | 1 |

US 7,143,308 B2

APPARATUS, SYSTEM, AND METHOD FOR DIFFERENTIAL REBUILDING OF A REACTIVATED OFFLINE RAID MEMBER DISK

BACKGROUND OF THE INVENTION

1. Field of the Invention

This invention relates to restoring changed data onto a storage device and more particularly relates to restoring changed data onto a reactivated storage device in a redundant array of independent disks ("RAID") system.

2. Description of the Related Art

In a contemporary computing environment, a storage system frequently writes data to and reads data from one or more storage devices through a storage controller. The storage devices are typically hard disk drives, optical disks, solid state disks, magnetic tape drives, DVD disks, CD ROM disks, or the like. Such storage devices are referred to hereinafter as disks.

One common storage system is a RAID system. In the RAID system, the disks coupled to the storage controller are configured to form a non-redundant or redundant RAID array. One common type of RAID configuration is a striped array. Striping is a method of concatenating multiple disks into one logical drive. Striping involves partitioning each array member disk's storage space into stripes. Each stripe is a number of consecutively addressed data blocks. The stripes are then interleaved across all member disks in the array in a regular rotating pattern, so that the combined space of the logical drive is composed of ordered groups of stripes. Each stripe group includes one stripe from each member disk at the same relative address. The stripes in a stripe group are associated with each other in a way that allows membership in the group to be determined uniquely and unambiguously by the storage controller.

FIGS. 1a, 1b and 1c are schematic block diagrams illustrating one embodiment of RAID arrays 100. As depicted, each member disk 110 in the RAID array 100 comprises five stripes. In FIGS. 1a and 1b, the RAID arrays 100a and 100b include four member disks: member disk 1 110a, member disk 2 110b, member disk 3 110c, and member disk 4 110d. Each RAID array 100a, 100b comprises twenty (20) stripes arranged in five stripe groups consecutively numbered 0 through 4. Each such stripe group includes one stripe from each of the four member disks 110a, 110b, 110c, and 110d in corresponding locations.

FIG. 1a shows a configuration of a non-redundant RAID array 100a resulting in a logical drive 160a containing twenty (20) consecutively addressed data stripes configured as user data and numbered 0x, 1x, . . . 12x, and 13x in a hexadecimal representation. In FIG. 1b the RAID array 100b is a redundant RAID array, known as parity RAID array, which holds, in addition to user data, check data, commonly referred to as parity and numbered $P_0$, $P_1$, $P_2$, $P_3$, and $P_4$, distributed throughout the array, occupying one parity stripe per stripe group. The remaining stripes in the array are data stripes. As shown, the configured logical drive 160b has fifteen (15) consecutively addressed data stripes numbered 0x, 1x, . . . , Dx, and Ex in a hexadecimal representation. Check data in each stripe group is used to regenerate user data for a failed member disk when requested by a host.

FIG. 1c shows another type of redundant RAID array, a mirrored RAID array 100c, comprising member disk 1 110a and member disk 2 110b. During a write operation, the storage controller writes the same user data simultaneously on both member disks 110a and 110b in the mirrored RAID array 100c. As illustrated, the configured logical drive 160c includes five consecutively addressed data stripes numbered 0, 1, 2, 3 and 4. For a read operation, data may be read from either member disk 110a, 110b although the storage controller generally designates one member disk 110 as the master and the other as the backup.

Normally, for a logical drive 160 read or write request, the storage controller maps the specified logical drive 160 data block address to a stripe of a particular RAID member disk 110, accesses the data block, and performs the required operation on the mapped disk. Some requests may involve multiple stripes on separate member disks 110 in the stripe group, and as such, the storage controller may operate the involved member disks 110 independently in parallel. During any such operation, a disk error condition may result in a failure of one member disk 110 in the RAID array 100 to respond to the storage controller's attempt to initiate a certain action, such as a disk selection, a command transfer, a control transfer, or a data transfer. The error condition may be persistent despite a pre-specified number of retries at various operation levels including a soft device reset by the storage controller.

A disk error condition may also manifest itself as a failure to continue or complete an operation that has been started. In any case, the storage controller will designate a persistently faulty member disk 110 as offline. Conventionally, such a "dead" disk is sent back to the manufacturer for repair. In some cases in which an operable member disk is removed for a certain service action, the storage controller may also mark the absent member disk 110 offline.

If the offline member disk 110 is a member of a non-redundant RAID array 100a, for example, the member disk 10b shown in FIG. 1a, the associated logical drive 160a will be designated as offline, making data inaccessible. In such a case, generally a user-initiated data restoration will have to occur before the associated logical drive 160a is brought back in operation. If the designated offline disk 110 is a member of a parity RAID array 100b such as the member disk 110b shown in FIG. 1b, data associated with the offline member disk 110b is still accessible. The storage controller can regenerate data for the offline member disk 110b based on the contents of all the surviving member disks 110a, 110c, and 110d when a request for such data occurs. With a mirrored RAID array 100c such as that shown in FIG. 1c, data is available from a surviving disk 110a if another member disk 110b is offline. On the other hand, with either type of the redundant RAID array 100b, 100c, any user data that is destined for the offline member disk 110 on a write request is not written there although associated check data, if any, is updated on a surviving member disk 110.

Although a redundant RAID array 100b, 100c can continue to operate with one member disk 110 marked offline, the array 100b, 100c actually enters into a degraded mode of operation and the formed logical drive 16b, 160c, such as that shown in FIG. 1b, FIG. 1c, respectively, is said to be in a "degraded state" until the underlying faulty member disk 110 is replaced and all lost data resulting from the departure of the faulty member disk 110 from the array 100b, 100c is reconstructed on the new disk. The latter process is known as rebuilding. Running in a degraded mode by a RAID array 100b, 100c results in performance degradation and zero tolerance of any subsequent disk failure.

If a redundant RAID array 100b, 100c is configured with a hot standby disk, when one member disk 110 is marked offline, typically a process known as full rebuilding for the offline member disk 110 is automatically started on the hot standby disk in the background. A full rebuilding for a mirrored RAID array 100*c* or a parity RAID array 100*b* involves regenerating and writing onto the replacement disk all of the data lost from the offline member disk 110, with the replacement data including any check data being derived from all the surviving member disk(s) 110. A full rebuilding is typically time consuming and can last up to several hours for a large RAID array.

Unfortunately, many users do not purchase a spare disk 110 for each such RAID array 100 as a hot standby replacement, knowing that the spare is seldom used, that is, only during the period of a disk failure. If a redundant RAID array 100*b*, 100*c* is pre-configured with no hot standby disk, a hot swap disk, if available, inserted manually in place of the offline member disk 110 can be caused to undergo a similar full rebuilding automatically or manually.

Hard disk drive manufacturers, for example, receiving aforementioned dead hard disk drives for repair often find them quite operable following a power cycle and/or a special hard reset cycle, clearing the "fatal" error condition. With available advanced disk technology and array packaging technology, the storage controller can attempt to reactivate the offline member disk 110 so as to make the disk 110 online by means of special hard device reset protocols and/or an automated selective power cycle on the offline member disk 110 if the array enclosure is equipped with the latter capability. The success rate of thus bringing dead disks back to life is presently high enough to justify such an extended error recovery procedure for implementation in the storage controller for dead disk reactivation.

In some cases, a faulty member disk 110 marked offline may be made online by manually removing the disk 110 and re-inserting the disk 110 into the array. In cases in which an operable member disk 110 is designated offline because of the removal of the disk 110, re-insertion of the disk 110 may make the disk 110 online again. FIG. 1*d* is a schematic block diagram illustrating one embodiment of a high-density RAID enclosure 150. As shown, the RAID enclosure 150 includes four canisters: canister 1 130*a*, canister 2 130*b*, canister 3 130*c*, and canister 4 130*d*. Each such canister 130 holds two member disks 111, 112, 113, or 114 having individual carriers and sharing common enclosure accessories such as cooling fan, temperature sensor, and lock mechanism (none shown). The top disk of each such canister 130, for example, member disk 2*a* 112*a* of canister 2 130*b*, is a member disk of RAID-1 120*a* array. The bottom disk of the same canister 130, for example, member disk 2*b* 112*b* of canister 2 130*b*, is a member disk of RAID-2 120*b* array. RAID-1 120*a* and RAID-2 120*b* are redundant RAID arrays 100*b* such as shown in FIG. 1*b*. The two RAID arrays 120*a* and 120*b* may be operated independently or combined by data striping. In either case, each RAID array 120 can tolerate one disk failure.

If, for example, member disk 2*a* 112*a* of RAID-1 120*a* becomes faulty, as depicted in FIG. 1*d*, canister 2 130*b* may be removed from the RAID enclosure 150, and an available hot swap disk (not shown) may replace the faulty member disk 112*a*. Afterwards, canister 2 130*b* is re-inserted. Subsequent to the service action, both RAID-1 120*a* and RAID-2 120*b* may start full rebuilding independently, with the originally operable member disk 2*b* 112*b* restoring the online state in the latter RAID array 120*b*. Unfortunately, currently a time-consuming full rebuilding is likewise required of such reactivated member disk 112*b* in RAID-2 120*b* array.

From the foregoing discussion, it should be clear that a need exists for an apparatus, system, and method that track the stripes of the offline member disk 110 in a redundant RAID array 100*b*, 100*c* that were to be written on prior to making the disk 110 online by a reactivation and that execute a rebuilding only on those tracked stripes subsequent to the reactivation. Beneficially, such an apparatus, system, and method would shorten the duration of the array's degraded mode of operation and reduce the time required to complete rebuilding the reactivated member disk 110.

SUMMARY OF THE INVENTION

The present invention has been developed in response to the present state of the art, and in particular, in response to the problems and needs in the art that have not yet been fully solved by currently available RAID systems. Accordingly, the present invention has been developed to provide an apparatus, system, and method for rebuilding only changed stripes of an offline RAID member disk subsequent to a reactivation that overcome many or all of the above-discussed shortcomings in the art.

The apparatus to execute differential rebuilding ("DR") is provided with a logic unit containing a plurality of modules configured to functionally execute the necessary steps of a DR process on a reactivated offline member disk in a redundant RAID array configured without a hot standby disk. These modules in the described embodiments include a work-in-process ("WIP") map, a WIP map initialization module, a WIP map clear module, an extended error recovery module, a DR registration module, a stripe group selection module, a service module, and a WIP map update module.

The WIP map is configured for the offline member disk with an entry for each stripe group of the associated RAID array. Each map entry is configured to track the completion of a DR process on the corresponding stripe group. The DR process regenerates and writes data including any check data onto the offline member disk following a reactivation for the stripe group. The WIP map initialization module creates all the WIP map entries and initializes the entries to indicate that no DR process is outstanding on each corresponding stripe group. The WIP map clear module is configured to clear or remove a map entry for the corresponding stripe group having an offline member stripe which was destined but unable to store write data including any check data prior to the reactivation. Such a stripe group potentially requires a DR process to restore such data.

The extended error recovery module initiates a reactivation to make the offline member disk online if the disk is capable of electrical communication. The extended error recovery module also detects a state change to online from offline of the offline member disk. The DR registration module registers the DR process on the offline member disk becoming online subsequent to the reactivation and de-registers the DR process upon completion of all stripe groups required to undergo the DR process.

The stripe group selection module selects a stripe group from the set of cleared WIP map entries corresponding to the stripe groups pending a DR process. The service module performs the DR process on the reactivated member disk at the stripe within the selected stripe group. The WIP map update module sets the WIP map entry for the stripe group completing the DR process, indicating no more pending DR process.

A system of the present invention is also presented to execute a DR process on a reactivated offline member disk in a redundant RAID array configured without a standby replacement. The system in the disclosed embodiments includes a RAID array of member disks, an enclosure for the RAID array, and a storage controller coupled to the RAID array. The storage controller comprises a processor, a memory coupled to the processor, a WIP map, a WIP map initialization module, a WIP map clear module, an extended error recovery module, a DR registration module, a stripe group selection module, a service module, and a WIP map update module. In one embodiment, the system further includes an input/output ("I/O") module, a non-volatile memory, an audit-trail log module, and a fault-tolerant disk storage.

The WIP initialization module creates all the WIP map entries, initializing each entry to indicate no DR process is outstanding on the corresponding stripe group. The WIP map clear module clears a WIP map entry for the stripe group wherein the member stripe of the offline member disk was destined to store write data including any check data, indicating a DR process pending. The extended error recovery module reactivates the offline member disk so as to make the disk online again if the disk is capable of electrical communication. The extended error recovery module also detects a state change to online from offline of the offline member disk. The DR registration module registers the DR process on the offline member disk becoming online following the reactivation and de-registers the completed DR process. The stripe group selection module selects a stripe group based on the WIP map cleared entries. The service module performs the DR process on the reactivated member disk at the stripe within the selected stripe group. The WIP map update module sets a WIP map entry for the stripe group completing the DR process.

In one embodiment, the I/O module receives an I/O command to read or write data. The I/O command comprises a data block address of an active logical drive formed from the RAID array for a data block of a stripe group. The I/O module determines if the logical drive is operating in a degraded mode. If not, the I/O module accesses the data block. If the logical drive is operating in a degraded mode, the I/O module determines if a rebuilding process is active. If a rebuilding process is active, the I/O module determines if the associated stripe group is rebuilding pending. If not, the I/O module accesses the data block. If the associated stripe group is rebuilding pending, the I/O module delays access of the data block until the stripe group completes the rebuilding.

If no rebuilding process is active, the I/O module determines if the data block address is mapped to the offline member disk. If not, the I/O module accesses the data block. If the data block address is mapped to the offline member disk, the I/O module determines if the I/O command is a read command. If not, the I/O module skips the access of the data block and updates any check data of the associated stripe group on a surviving member disk as appropriate. If the I/O command is a read command, the I/O module regenerates data from member data blocks of all surviving member disks in the associated stripe group. In one embodiment, the I/O module updates any check data in the associated stripe group on a surviving member disk if required as a result of executing the I/O command.

In one embodiment, the audit-trail log module records an audit-trail log. The audit-trail log is configured as a log of the stripe group identifiers of the cleared WIP map entries. Each log entry indicates that the WIP map entry for the stripe group has been cleared. In a certain embodiment, the audit-trail log is stored in the non-volatile memory. In one embodiment, the audit-trail log module periodically stores a portion of the audit-trail log from the non-volatile memory to the fault-tolerant disk storage. In a further embodiment, the audit-trail log module reconstructs the WIP map from the audit-trail log stored in the non-volatile memory and the fault-tolerant disk storage. The audit-trail log module may reconstruct the WIP map after the WIP map is inadvertently lost, such as during a power failure.

A method of the present invention is also presented for executing a DR process on a reactivated offline member disk in a redundant RAID array configured without a hot standby disk. The method in the disclosed embodiments substantially includes the steps necessary to carry out the functions presented above with respect to the operation of the described apparatus and system. In one embodiment, the method includes creating a WIP map and initializing each entry thereof, clearing a WIP map entry, reactivating the offline member disk, detecting a state change to online from offline, registering a DR process, selecting a stripe group, performing the DR process, setting the WIP map entry for the selected stripe group, and de-registering the DR process upon completion.

The WIP initialization module creates all the WIP map entries for the offline member disk, initializing each to indicate no DR process is outstanding on the corresponding stripe group. The WIP map clear module clears a map entry for the stripe group requiring a DR process due to a prior unfulfilled write requirement on the member stripe of the offline member disk. The extended error recovery module reactivates the offline member disk so as to make the disk online again. The DR registration module registers the DR process on the offline member disk becoming online following the reactivation. The stripe group selection module selects a stripe group requiring the DR process. The service module performs the DR process on the reactivated member disk at the stripe within the selected stripe group. The WIP map update module sets a WIP map entry for the stripe group completing the DR process. The service module determines if the DR process is complete. If the DR process is complete, the DR registration module de-registers the DR process and the method terminates. If the DR process is not complete, the stripe group selection module selects a next stripe group and the service module performs the DR process on the next selected stripe group.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention employs a WIP map to track changed stripes of the offline member disk prior to a reactivation of the disk and the completion of a DR process on each stripe group containing the stripes in the RAID array. In addition, the present invention shortens the duration of the array's degraded mode of operation due to a member disk failure and reduces the time required to complete rebuilding the faulty member disk subsequent to a removal of the fault by rebuilding only changed stripes. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 1a, 1b and 1c are schematic block diagrams illustrating one embodiment of RAID arrays;

FIGS. 6a, 6b, and 6c are schematic block diagrams illustrating one embodiment of an exemplary WIP map operation for a parity RAID array in accordance with the present invention;

DETAILED DESCRIPTION OF THE INVENTION

Figure 1D:
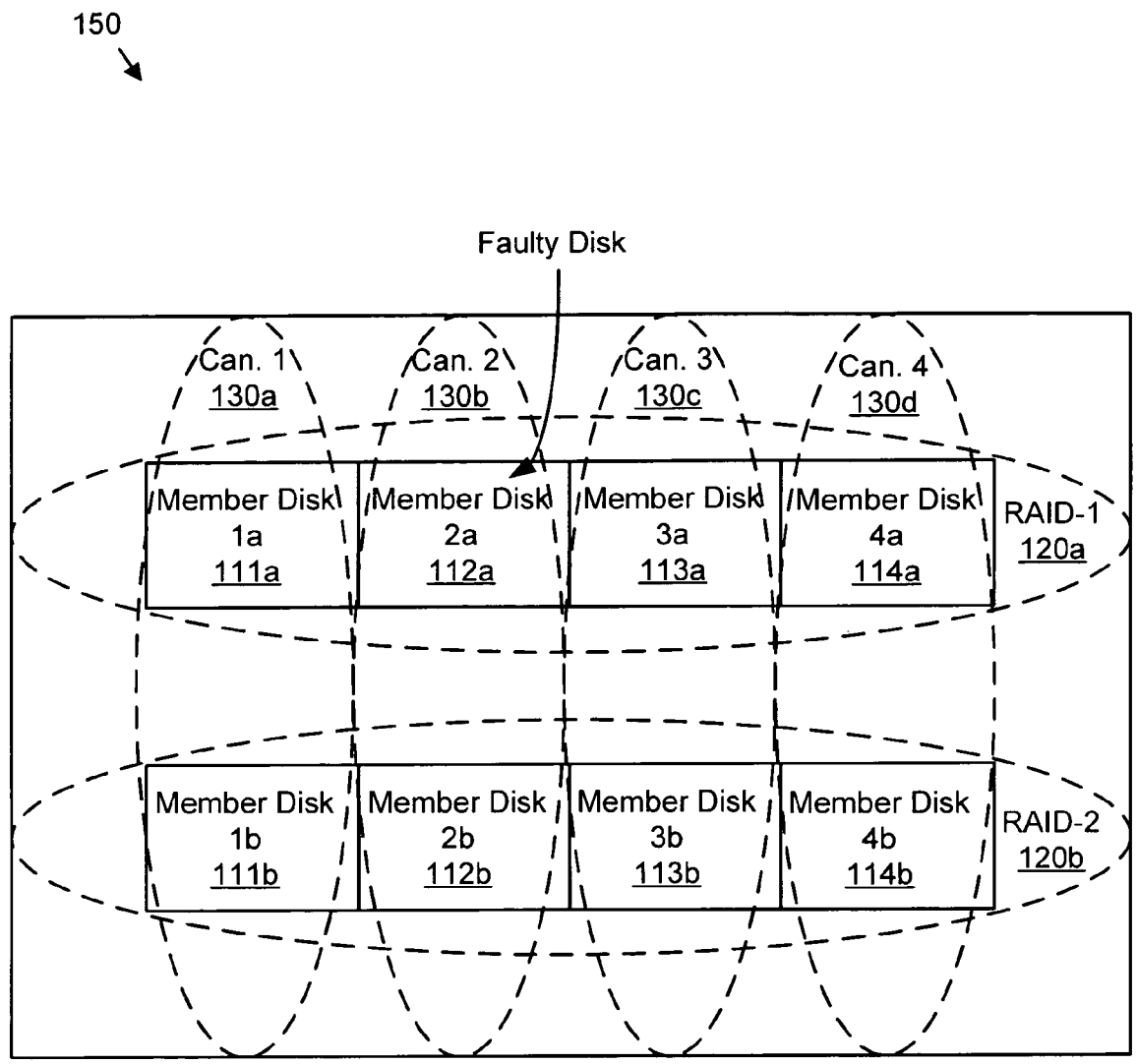
FIG. 1d is a schematic block diagram illustrating one embodiment of a high-density RAID enclosure.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different member disks, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 2:
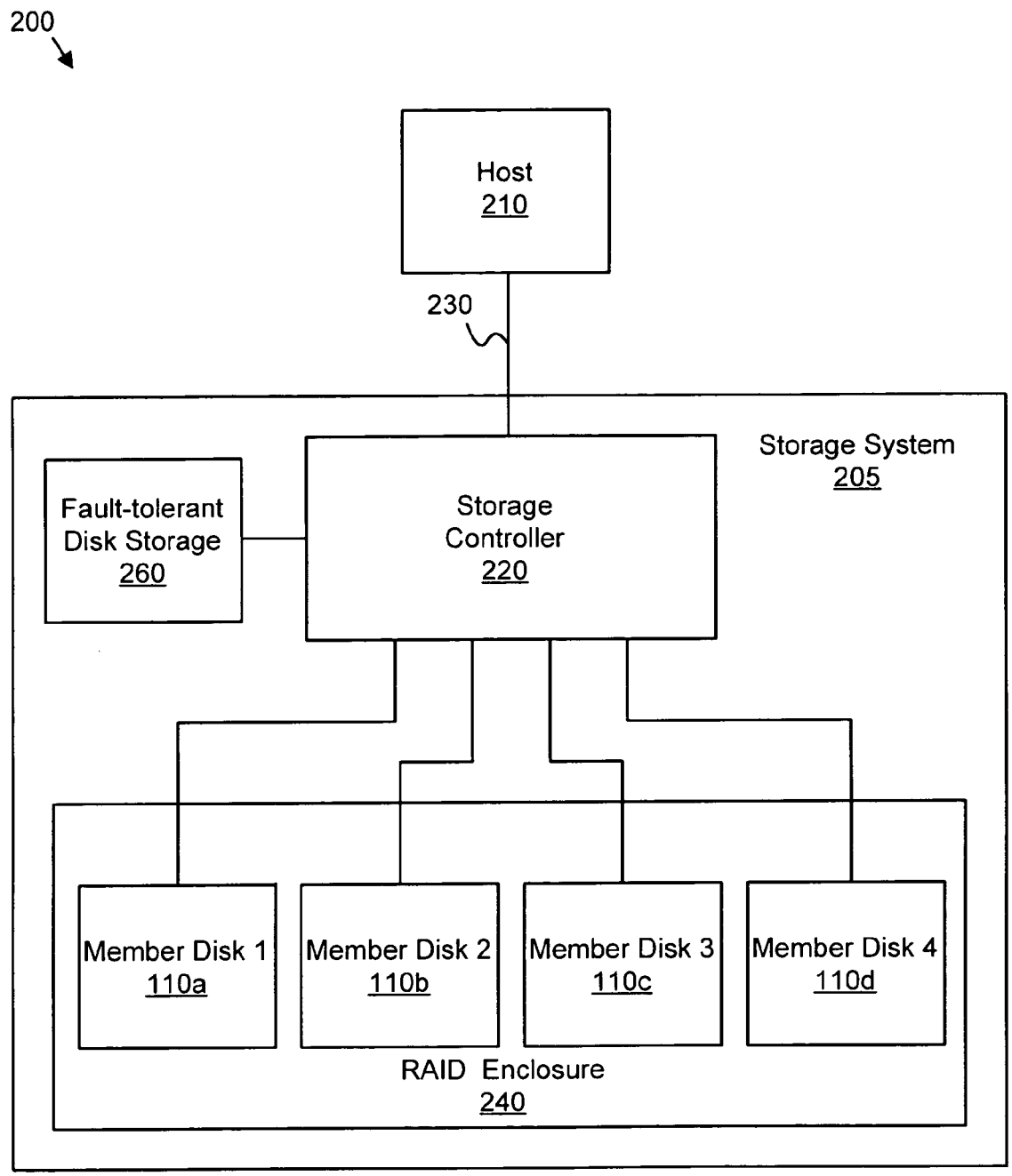
FIG. 2 is a schematic block diagram illustrating one embodiment of a system for fault tolerant data storage and retrieval in accordance with the present invention.

FIG. 2 depicts a schematic block diagram illustrating one embodiment of a system 200 for fault tolerant data storage and retrieval in accordance with the present invention. The system 200 services host 210 requests for writing data to and reading data from a storage system 205 with built-in fault tolerance. The storage system 205 includes a storage controller 220, member disk 1 110a, member disk 2 110b, member disk 3 110c, member disk 4 110d, a RAID enclosure 240 housing the member disks 110, a fault-tolerant disk storage 260, and an interface 230 coupling the storage controller 220 to the host 210. In one embodiment, the member disks 110 form a RAID array 100. Although for purposes of clarity, four member disks 110, and one RAID enclosure 240 are shown, any number of member disks 110 and RAID enclosures 240 may be used.

As is well known to those skilled in the art, the storage controller 220 includes a processor, memory, and various modules used to perform a number of storage control functions in execution of read and write requests from the host 210. In a certain embodiment, the storage controller 220 may also include a non-volatile memory. Supporting various RAID array configurations and operations, main functional elements of the storage controller 220 may include a RAID configuration tracker, and a RAID manager, in addition to typical storage control functions such as an Input/Output ("I/O") interfacing, a host interfacing, an I/O command handler, a bi-directional data mover with buffering, an enclosure interfacing, and an error recovery handler.

The RAID configuration tracker saves and references information in the storage controller's 220 memory and/or non-volatile memory on the RAID array 100 configuration a user has created by running a RAID array configuration utilities software. In one embodiment, the same configuration information is also stored on each RAID member disk 110. The array configuration information may include the type of RAID array 100 such as illustrated in FIGS. 1a, 1b and 1c, namely a non-redundant RAID array 100a, a redundant RAID array 100b with distributed parity or fixed parity (not shown), and a mirrored RAID array 100c, the number and ordering of configured member disks 110 in the RAID array 100, the stripe size, zero or more hot standby disks, the number of logical drives 160, and each logical drive 160 size. In a certain embodiment, write cache enablement may also be specified.

The RAID configuration tracker also tracks the state of each member disk 110. Disk states may include online, offline, standby, and rebuild. A disk is in an online state if the disk is a member of the RAID array 100 and operating properly. A disk is in an offline state if the disk failed to operate, or if the disk is not present, or if the disk is present but not powered on. A disk is in a standby state if the disk is able to operate properly but not defined as a member of the RAID array 100. A disk is in a rebuild state during the process of rebuilding involving data regeneration and writing to the disk.

Furthermore, the RAID configuration tracker tracks the state of each logical drive 160 formed from the array 100 such as the logical drives 160a, 160b, and 160c shown in FIGS. 1a, 1b, and 1c, respectively. Logical drive 160 states may include online, degraded, or offline. A logical drive 160 is in an online state if all the participating member disks 110 of the RAID array 100 are online. A logical drive 160 is in a degraded state if one member disk 110 is offline or in a rebuild state. A logical drive 160 is in an offline state if no data can be read from or written to the logical drive 160. Such logical drive 160 state occurs if the underlying redundant RAID array 100b, 100c has two or more member disks 110 in an offline state, or if the underlying non-redundant RAID array 100a has one or more member disks 110 in an offline state.

The RAID manager performs a data protection function. For a mirrored array 100c such as depicted in FIG. 1c, the RAID manager causes user data to be simultaneously written on both member disks 110, so that if one member 110b is offline, data is still accessible from the surviving member 110a. For a parity RAID array 100b as shown in FIG. 1b, the RAID manger typically performs check data generation, to protect against data loss and loss of data access due to a single disk or media failure. The term check data refers to any kind of redundant information that allows regeneration of unreadable data from a combination of readable data and the redundant information itself. The parity RAID arrays 100b utilize the Boolean "Exclusive OR" function to compute check data. The function is applied bit-by-bit to corresponding stripes in each array's user data areas, and the result is written to a corresponding parity stripe.

In conjunction with the I/O command handler, the RAID manager maps the logical drive 160 data block address specified by an I/O command from the host 210 to an array data stripe number and a physical block address on the associated member disk 110 for a read or write operation. On a normal write operation the RAID manager also updates any check data in the associated stripe group. In one embodiment, the RAID Manager reads both the data to be replaced and the old check data from associated member disks 110, computes the Exclusive OR of the two data items together with the replacement data, and rewrites the resultant new check data on the parity stripe.

In the event that one member disk 110, say member disk 2 110b, fails and is marked offline subsequent to unsuccessful recovery actions of the error recovery handler, and that a data block address from an I/O command is mapped to the offline member disk 110b in a parity RAID array 100b such as shown in FIG. 1b, the RAID manager handles the read command differently from a write command. For a read, the RAID manager regenerates the data by reading corresponding data blocks including check data from surviving member disks 110a, 110c, and 110d and computing the Exclusive OR of the contents thereof.

For a write, the RAID manager skips the writing of new data on the offline member disk 110b, reads corresponding data blocks excluding check data from the surviving member disks 110, and updates the check data on a surviving member disk 110 by computing the Exclusive OR of the contents of the data blocks together with the new data. If the data block address specified by a write command is mapped to a surviving member disk 110a, 100c, 100d, and the offline member disk 110b contains associated check data, then the write command is executed as usual, with the omission of updating the check data by the RAID manager. For a write command on a mirrored RAID array 100c, such as illustrated in FIG. 1c, with one member disk 110b marked offline, for example, the RAID manager performs the write only on the surviving member disk 110a.

With one member disk 110, for example, member disk 2 110b, being designated offline, the logical drive 160b as depicted in FIG. 1b enters into a degraded state, with no more fault tolerance against a subsequent disk failure. In order to restore full data protection, the offline member disk 110b needs to be replaced by a functional disk, and the RAID manager makes the contents of the replacement disk consistent with the contents of the remaining array members. To that end, the RAID manager reads for each stripe group corresponding stripes from each of the surviving original member disks 110a, 110c, 110d, computes the Exclusive OR of these stripes' contents, and writes the result to the replacement disk's stripe within the stripe group. This process is called rebuilding, and since each stripe group participates in the rebuilding, this kind of rebuilding process is known as full rebuilding. For rebuilding a replacement disk in a mirrored RAID array 100c such as depicted in FIG. 1c, the RAID manager derives replacement data from the surviving member disk 110.

Many RAID array 100 configurations may not include a hot standby disk. In accordance with the present invention, the error recovery handler extends its error recovery function to include disk reactivation by issuing special device reset protocols or a selective power cycle, if implemented, on the offline member disk 110b in the previous example, if the disk is capable of electrical communication. If the extended error recovery handler detects the state change to online in the offline member disk 110b subsequent to the reactivation, the extended error recovery handler notifies the RAID manager to start a rebuilding process thereon, in the absence of a hot standby disk. In one embodiment, if member disk 2 110b was marked offline because of a removal from the array instead of being faulty, upon re-insertion of member disk 2 110b, the extended error recovery handler would find member disk 2 110b online again, likewise leading to a rebuilding.

The system 200 provides means in the storage controller 220 for tracking each changed stripe resulting from a requirement to write user data or any check data on the offline member disk 110b, in the same example, prior to a reactivation. Such a write requirement may originate from a write data command issued by the host 210 or an internal write request such as a stripe group initialization or an online capacity expansion. Consequently, the RAID manager posts a "mark on the wall" in the storage controller's 220 memory for each stripe group containing such changed stripe.

Thus, once the RAID manager starts a rebuilding process on the reactivated member disk 110b in the example, the RAID manager needs to rebuild only each changed stripe thereon based on the marks on the wall. This rebuilding process is referred to as differential rebuilding ("DR"), as opposed to the conventional full rebuilding that reconstructs each stripe of the offline member disk 110b. Subsequent to the rebuilding on each changed stripe, the RAID manager removes the corresponding mark on the wall, indicating that the contents consistency of the associated stripe group has been restored.

The system 200 further provides means in the storage controller 220 for reconstructing the list of the marks on the wall for stripe groups requiring a DR process subsequent to such event as a power failure. In one embodiment, for access speed reasons, the storage controller 220 may use a non-volatile memory for the most recent list of the marks on the wall and use the fault-tolerant disk storage 260 to store an older list of marks on the wall. Such lists represent an audit-trail log. In an alternate embodiment, the storage controller 220 may utilize unused storage space on member disks 110 to form a fault-tolerant disk storage for the audit-trail log instead of the separate fault-tolerant disk storage 260. The system 200 services needs of the host 210 for non-stop data retrieval and storage in a storage system 205 despite any single disk failure and restores any lost data efficiently.

Figure 3:
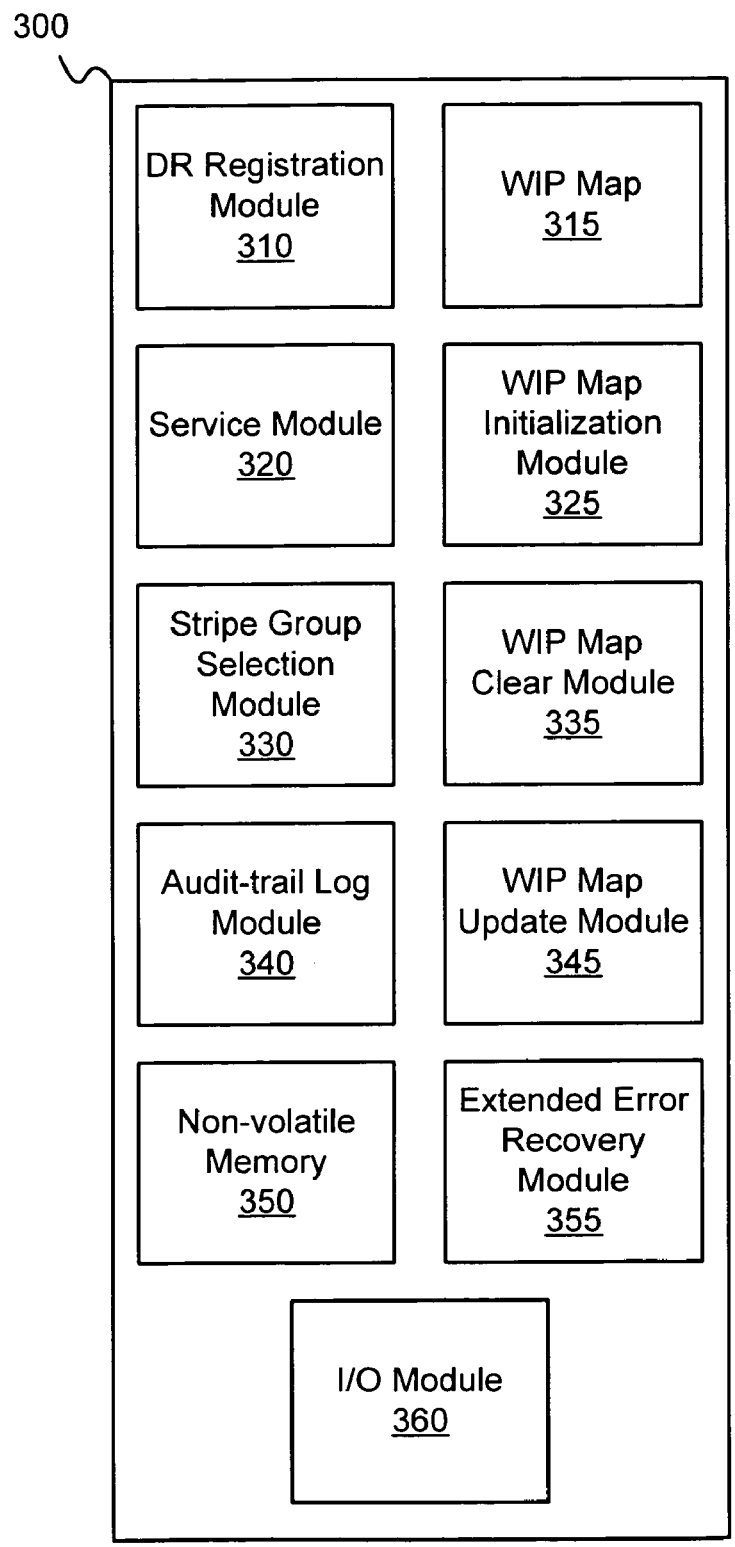
FIG. 3 is a schematic block diagram illustrating one embodiment of a DR apparatus in accordance with the present invention.

FIG. 3 is a schematic block diagram illustrating one embodiment of a DR apparatus 300 of the present invention. The DR apparatus 300 performs and tracks the completion of a DR process configured to rebuild each changed stripe of an offline member disk 110 in a redundant RAID array 100b, 100c with no hot standby disk such as that shown in FIGS. 1b and 1c, subsequent to a state change to online by the disk 110 following a reactivation. The DR apparatus 300 may be located in the Storage Controller 220 of FIG. 2. The DR apparatus 300 includes a WIP map 315, a WIP initialization module 325, a WIP map clear module 335, a WIP map update module 345, an extended error recovery module 355, a DR registration module 310, a service module 320, a stripe group selection module 330, an audit-trail log module 340, a non-volatile memory 350, and an I/O module 360.

The WIP map 315 is configured with a WIP map entry for each stripe group of the RAID array 100. The WIP map entry tracks the completion of a DR process that involves regeneration and writing of data including any check data for a stripe group on the offline member disk 110 reactivated to become online. The WIP map initialization module 325 creates the WIP map 315 and initializes each entry to indicate no outstanding DR process on the corresponding stripe group. The WIP map clear module 335 clears a WIP map entry for a stripe group in which a member stripe belonging to the offline member disk 110 was destined to store user data or any check data but unable to do so prior to the reactivation, indicating a DR process pending subsequent to the reactivation.

The extended error recovery module 355 attempts to reactivate the offline member disk 110 so that the disk may come online provided that the disk is capable of electrical communication. In certain embodiments, a member disk 110 may be designated offline if the disk is not present, that is, it is temporarily removed from the array. Reinserting the removed member disk 110 may cause the disk to come online again. The extended error recovery module 355 is configured to detect the state change to online from offline of the offline member disk 110 subsequent to a reactivation.

In one embodiment, a reactivation by the extended error recovery module 355 includes a device reset cycle and an automated selective device power cycle. The extended error recovery module 355 may designate the offline member disk 110 as permanently offline if the disk 110 fails to come online within a pre-specified period of time. In a certain embodiment, if the extended error recovery module 355 detects that a hot swap disk bearing a new identity such as a unit serial number replaces the offline member disk 110, the extended error recovery module 355 makes the replacement disk a candidate for a full rebuilding process on each stripe.

The DR registration module 310 registers a DR process subsequent to the reactivation whereby the offline member disk 110 returns to the online state, and de-registers the DR process upon completion. A stripe group selection module 330 selects each stripe group which has a WIP map 315 entry cleared. In one embodiment, the stripe group selection is based on an ascending numerical order of the stripe group number. The service module 320 performs the DR process, which includes regenerating and writing onto the reactivated member disk 110 data including any check data, at the stripe within the selected stripe group. The WIP map update module 345 sets the WIP map 315 entry for the stripe group completing the DR process.

The WIP map 315 entry for a stripe group may consist of one bit. The WIP initialization module 325 sets the bit of each such entry to a binary one (1) initially, indicating that the corresponding stripe group has no pending DR process. Once write data including any check data is targeted for a stripe of the offline member disk 110 prior to the reactivation, the WIP map clear module 335 clears the bit in the WIP map 315 entry for the associated stripe group to a binary zero (0). Upon completion of a DR process on the stripe group subsequent to the reactivation, the WIP map update module 345 sets the bit back to a binary one (1), indicating that the corresponding stripe group has completed a DR process.

In certain embodiments, the I/O module 360 receives an I/O command to read or write data. The I/O command includes information such as a data block address of an active logical drive 160 formed from the RAID array 100 and one or more consecutive data blocks to be accessed. The I/O module 360 determines if the logical drive 160 is in a degraded state, that is, if one member disk 110 is offline or being rebuilt. If the logical drive 160 is not in a degraded state, the I/O module 360 accesses the data block. If the logical drive 160 is in a degraded state, the I/O module 360 determines if a rebuilding process is active.

If a rebuilding process is active, the I/O module 360 determines if the associated stripe group has a pending rebuilding process. If not, the I/O module 360 accesses the data block. If the associated stripe group has a pending rebuilding process, the I/O module 360 in one embodiment delays the access of the data block until the rebuilding process is complete on the stripe group.

If the logical drive 160 is in a degraded state and no rebuilding process is active, the I/O module 360 determines if the data block address is mapped to the offline member disk 110. If not, the I/O module 360 accesses the data block. If the data block address is mapped to the offline member disk 110, the I/O module 360 determines if the I/O command is a read command. If not, the I/O module 360 skips an access to the data block and updates any check data on a surviving member disk 110. If the I/O command is a read command, the I/O module 360 regenerates data by reading corresponding data blocks of all the surviving member disks 110 in the associated stripe group and computing the Exclusive OR of the contents read. In one embodiment, as a result of executing the I/O command, the I/O module 360 determines if updating any check data of the stripe group is required on a surviving member disk 110. If so, the I/O module 360 updates the check data.

The audit-trail log module 340 may record an audit-trail log. The audit-trail log is configured as a log of the stripe group identifiers for each stripe group with a WIP map 315 entry cleared by the WIP map clear module 335. The stripe group identifiers in one embodiment are stripe group numbers such as those shown in FIGS. 1a, 1b, and 1c. Each log entry forms an audit trail indicating that the WIP map 315 entry has been cleared for the indicated stripe group.

In one embodiment, the fault-tolerant disk storage 260 stores a portion of the audit-trail log. The audit-trail log module 340 may periodically copy portions of the audit-trail log from the non-volatile memory 350 to the fault-tolerant disk storage 260 to free data storage space used by the audit-trail log in the non-volatile memory 350. The audit-trail log may reside in the non-volatile memory 350 or the fault-tolerant disk storage 260. Furthermore, portions of the audit-trail log may reside in both the non-volatile memory 350 and the fault-tolerant disk storage 260.

In certain embodiments, the audit-trail log module 340 recovers the cleared entries of the WIP map 315 from the audit-trail log. The audit-trail log module 340 may reconstruct the cleared entries of the WIP map 315 after the WIP map 315 is inadvertently lost in an event such as a power failure. In a further embodiment, the audit-trail log module 340 directs the WIP map initialization module 325 to re-initialize the WIP map 315. The audit-trail log module 340 may further read each entry of the audit-trail log and direct the WIP map clear module 335 to clear each corresponding entry of the WIP map 315. The DR apparatus 300 performs and tracks the completion of a DR process on the reactivated member disk 110 at each stripe within a stripe group having a pending DR process as indicated in the corresponding entry in the WIP map 315.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
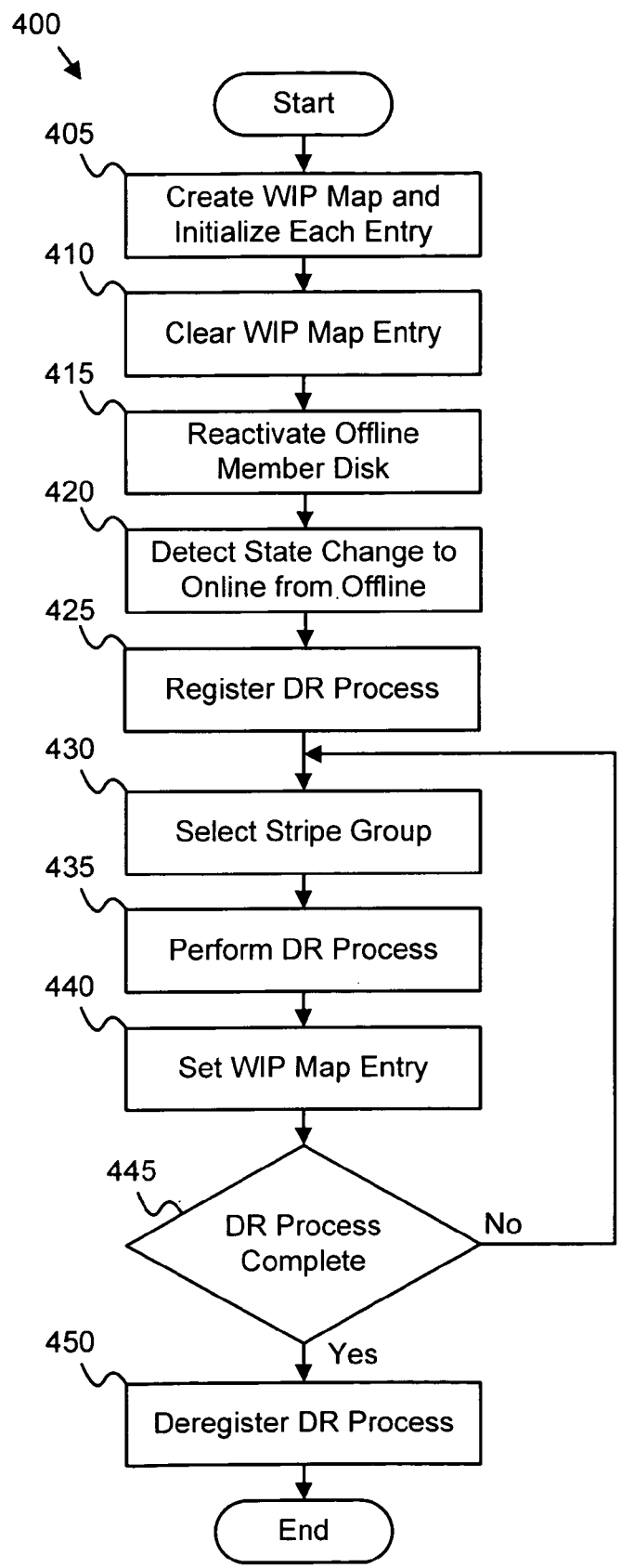
FIG. 4 is a schematic flow chart diagram illustrating one embodiment of a DR method in accordance with the present invention.

FIG. 4 is a schematic flow chart diagram illustrating one embodiment of a DR method 400 in accordance with the present invention. The WIP map initialization module 325 creates 405 a WIP map 315 and initializes 405 each entry thereof, indicating that the corresponding stripe group has no outstanding DR process. In one embodiment, the WIP map 315 is a bit map with single-bit entries for tracking the completion of a DR process for each stripe group. As such, a binary one (1) value is given to the bit for each entry. The DR process on a stripe group involves regenerating and writing data including any check data onto an offline member disk 110 becoming online subsequent to a reactivation for the stripe group.

The WIP map clear module 335 clears 410 a WIP map 315 entry for a stripe group if the member stripe of an offline member disk 110 was destined to store write data including any check data prior to the reactivation of the disk to become online. Such a cleared entry indicates that the corresponding stripe group has a pending DR process and remains cleared until the pending DR process is completed. If the WIP map 315 is a bit map, clearing an entry amounts to resetting the bit to a binary zero (0) from a binary one (1) as initialized. In one embodiment, an audit-trail module 340 enters the number of the stripe group corresponding to the cleared WIP map (315) entry in an auto-trail log.

The extended error recovery module 355 reactivates 415 the offline member disk 110 if the disk 110 is capable of electrical communication. In one embodiment, the error recovery module 355 issues device reset protocols and/or an automated selective power cycle to the disk 110 for reactivation. In certain embodiments, an offline member disk 110 may be manually reactivated by removing and subsequently re-inserting the disk. In an alternate embodiment, if a member disk 110 became offline due to a removal of the disk 110 from the array 100, the member disk 110 may become online again by re-inserting the disk 110. Whether the reactivation is applied by the extended error recovery module 355 or by the manual maneuver, the extended error recovery module 355 detects 420 a state change to online from offline of the offline member disk 110 subsequent to the reactivation.

The DR registration module 310 registers 425 the DR process subsequent to the state change to online of the reactivated member disk 110 detected by the extended error recovery module 355. The stripe group selection module 330 selects 430 a stripe group from the set of cleared entries of the WIP map 315. For example, if the WIP map 315 is a bit map and the stripe group selection module 330 queries the bit representing stripe group three (3), the stripe group selection module 330 may select stripe group three (3) if the queried bit has a binary value zero (0), indicating that a DR process is pending.

The service module 320 performs 435 the DR process on the stripe group selected by the stripe group selection module 330. The DR process performed on the reactivated member disk 110 at the stripe within the selected stripe group comprises regenerating data including any check data by means of reading member stripes of all surviving original member disks 110 and computing the Exclusive OR of the contents thereof, and writing the result on the stripe of the reactivated member disk 110.

The WIP map update module 345 sets 440 the WIP map 315 entry for the stripe group completing the DR process by the service module 320. If the WIP map 315 is a bit map, the WIP map update module 345 sets the corresponding bit in the WIP map 315 to a binary one (1). If the audit-trail log module 340 had entered the stripe group number in the audit-trail log for the stripe group pending a DR process, the audit-trail log module 340 removes the audit-trail log entry containing the stripe group number since the stripe group has completed the DR process.

The service module 320 determines 445 if the DR process is complete for each stripe group. In one embodiment, the service module 320 determines 445 that the DR process is complete by verifying that each cleared WIP map entry indicates the DR process is complete. If the DR process is complete, the DR registration module 310 may deregister 450 the DR process and the method 400 terminates. If the DR process is not complete, the stripe group selection module 330 selects 430 a next stripe group such as the next higher numbered stripe group based on cleared entries of the WIP map 315. The service module 320 performs 440 the DR process on the next selected stripe group. The DR method 400 tracks the completion of the DR process using the WIP map 315.

Figure 5:
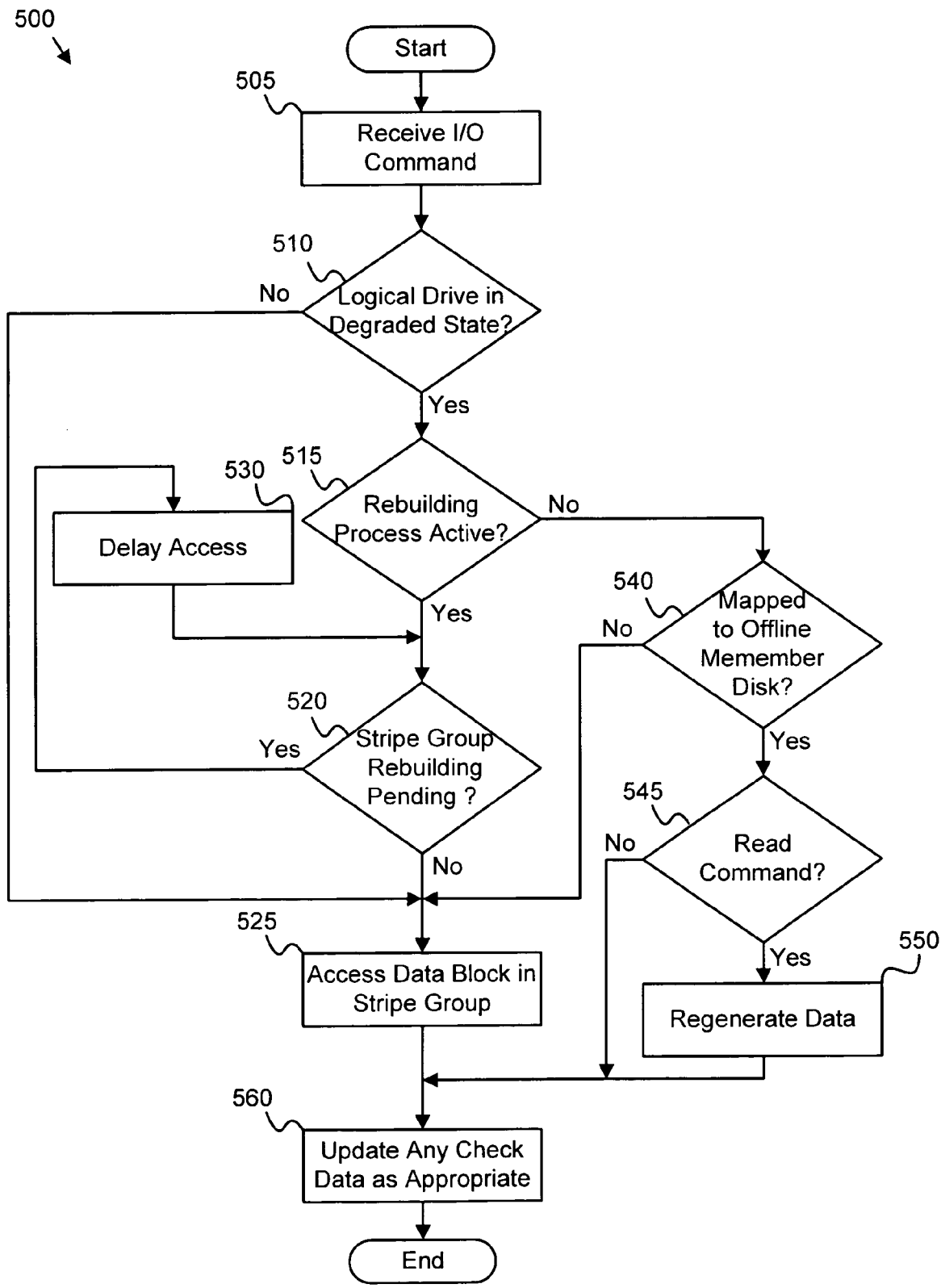
FIG. 5 is a schematic flow chart diagram illustrating one embodiment of a data access method in accordance with the present invention.

FIG. 5 is a schematic flow chart diagram illustrating one embodiment of a data access method 500 in accordance with the present invention. The I/O module 360 receives 505 a read/write I/O command specifying a data block address of an active logical drive 160 that can be mapped to a member disk 110 and the associated stripe group. In one embodiment, the I/O module 360 receives 505 the I/O command from a host 210 such as the host 210 of FIG. 2. The I/O module 360 determines 510 if the logical drive 160 is in a degraded state. If not, that is, the logical drive 160 is in an online state, the I/O module 360 accesses 525 the addressed data block in the stripe group. If the logical drive 160 is in a degraded state, the I/O module 360 determines 515 if a rebuilding process is active, in the absence of a hot standby disk.

If a rebuilding process is active, the I/O module 360 determines 520 if the stripe group has a pending rebuilding process. In one embodiment, the I/O module 360 queries the WIP map 315 entry for the stripe group to determine 520 if the WIP map 315 entry is cleared. If not, the I/O module 360 accesses 525 the addressed data block. If the stripe group has a pending rebuilding process, the I/O module 360 may delay 530 the access to the data block until the rebuilding process is no longer pending on the stripe group.

If it is the logical drive 160 is in a degraded state and no rebuilding process is active, the I/O module 360 determines 540 if the data block address is mapped to an offline member disk 110. If not, the I/O module 360 accesses 525 the addressed data block. The I/O module may notify the WIP map clear module 335 to clear 410 a WIP map 315 entry for the associated stripe group if the member stripe of the offline member disk 110 contains any check data, and the check data needs to be updated. If the WIP map 315 entry has not been cleared, the WIP map clear module 335 will do so. In conjunction with such an action by the WIP map clear module 335, the audit-trail log module 340 may record the stripe group identifier in an audit-trail log.

If the data block address is mapped to the offline member disk 110, the I/O module 360 determines 545 if the I/O command is a read command. If not, the I/O command is typically a write command, and the I/O module 360 skips an access to the data block and updates 560 any check data on a surviving member disk 110 as appropriate. The I/O module 360 may notify the WIP clear module 335 to clear 410 the WIP map 315 entry for the associated stripe group. If the WIP map 315 entry has not been cleared, the WIP map clear module 335 will do so. In conjunction with such action by the WIP map clear module 335, the audit-trail log module 340 may record the stripe group identifier in an audit-trail log.

If the I/O command is a read command, the I/O module 360 regenerates 550 data by reading corresponding data blocks of all the surviving member disks 110 in the stripe group and computing the Exclusive OR of the contents read. In one embodiment, as a result of executing the I/O command, the I/O module 360 updates 560 any check data of the stripe group on a surviving member disk 110 if the check data is required to be updated. The method 500 completes the execution of an I/O command regardless of whether the logical drive 160 is in an online state or a degraded state.

FIGS. 6a, 6b, and 6c are schematic block diagrams illustrating one embodiment of an exemplary manner of WIP map operation 600 for a parity RAID array 100b in accordance with the present invention. In the depicted embodiments, the WIP map 315 is a bit map, each entry of which is a single bit, tracking the completion of a DR process for a stripe group. As shown, the parity RAID array 100b with a formed logical drive 160b includes four (4) member disks 110, namely member disk 110a, member disk 2 110b, member disk 3, 110c, and member disk 4, 110d. The array includes five (5) stripe groups numbered 0 through 4. The WIP map initialization module 325 initializes 405 the bit of each WIP map 315 entry to a binary one (1), indicating that each associated stripe group has no outstanding DR process, as illustrated in FIG. 6a. The WIP map operation 600 executes the first step of initializing the WIP map 315.

FIG. 6b shows that member disk 2 110b becomes offline. Subsequently, an exemplary write command operation (not shown) requires a write on data stripe 1 670 of the logical drive 160b, which is mapped to member disk 2 110b. Consequently, the WIP map clear module 335 clears 410 the entry 605 to a binary zero (0) of the WIP map 315 for stripe group number 0, which includes data stripe 1 670. Similarly, a second exemplary write command (not shown) operates on stripe group number 2 at data stripe 8 675, which is mapped to member disk 4 110d. Subsequent to the write operation, parity stripe $P_2$ on member disk 2 110b, a member stripe of stripe group number 2 is required to be updated. The WIP map clear module 335 clears 410 the entry 610 to a binary zero (0) of the WIP map 315 for stripe group number 2. This type of cleared entries of WIP map 315 indicate that each associated respective stripe group has a pending DR process. The WIP map operation 600 executes the second step: clearing the WIP map 315 entries for each stripe group having a pending DR process.

FIG. 6c indicates that member disk 2 110b has been reactivated, thereby becoming online. The service module 320 performs 435 a DR process on member disk 2 110b within stripe group number 0 and stripe group number 2 at data stripe 1 and parity stripe $P_2$, respectively. Following the completion of a DR process, the WIP map update module 345 sets 440 entries 605 and 610 to binary ones (1s) of the WIP map 315 accordingly, indicating that stripe groups number 0 and number 2 have no more pending DR processes. The WIP map operation 600 completes the third and last step: setting each WIP map 315 entry subsequent to the completion of a DR process on the associated stripe groups.

FIGS. 7a, 7b, 7c, and 7d are schematic block diagrams illustrating one embodiment of an exemplary manner of tracking of changed stripes 700 with a WIP map 315 and an audit-trail log 740 in accordance with the present invention. As shown, the audit-trail log 740 may store portions of the audit-trail log 740*a* in the non-volatile memory 350 and remaining portions of the audit-trail log 740*b* in the fault-tolerant disk storage 260. In the depicted embodiments in FIGS. 7*a*, 7*b*, 7*c*, and 7*d*, the WIP map 315 includes ten (10) single-bit entries representing ten (10) stripe groups 710, for example, stripe group 0 710*a*, stripe group 1 710*b*, and so forth, and each entry of the audit-trail logs 740*a* and 740*b* contains the number of the stripe group with a cleared entry containing a binary zero (0) of the WIP map 315. The cleared entries of the WIP map 315 represent each stripe group that has a pending DR process. As illustrated, the audit-trail log 740*a* has four (4) entries 730*a*, 730*b*, 730*c*, and 730*d*. In one embodiment, the audit-trail log 740*b*, stored in the fault-tolerant disk storage 260, may contain as many entries as the WIP map 315 or more.

Figure 7A:
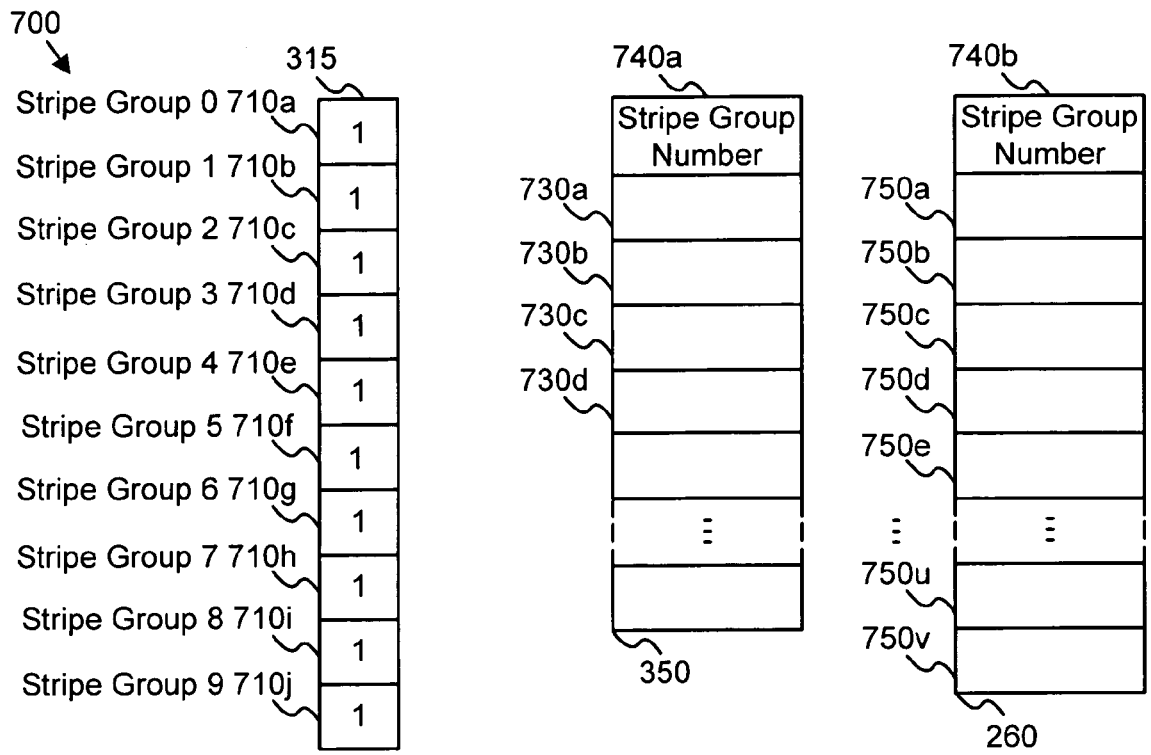
FIGS. 7a, 7b, 7c, and 7d are schematic block diagrams illustrating one embodiment of an exemplary tracking of changed stripes with a WIP map and an audit-trail log in accordance with the present invention.

FIG. 7*a* indicates the initial conditions of the WIP map 315 and the audit-trail logs 740*a* and 740*b*. The WIP map initialization module 325 initializes 405 the bit of each entry of the WIP map 315 to a binary one (1), indicating no pending DR process for the corresponding stripe group. The audit-trail log module 340 removes all contents of audit-trail logs 740*a* and 740*b*, showing no valid entries. In an alternate embodiment, the audit-trail log module 340 may enter an invalid stripe group number in each entry of the audit-trail log 740 to represent the absence of a valid entry.

Figure 7B:
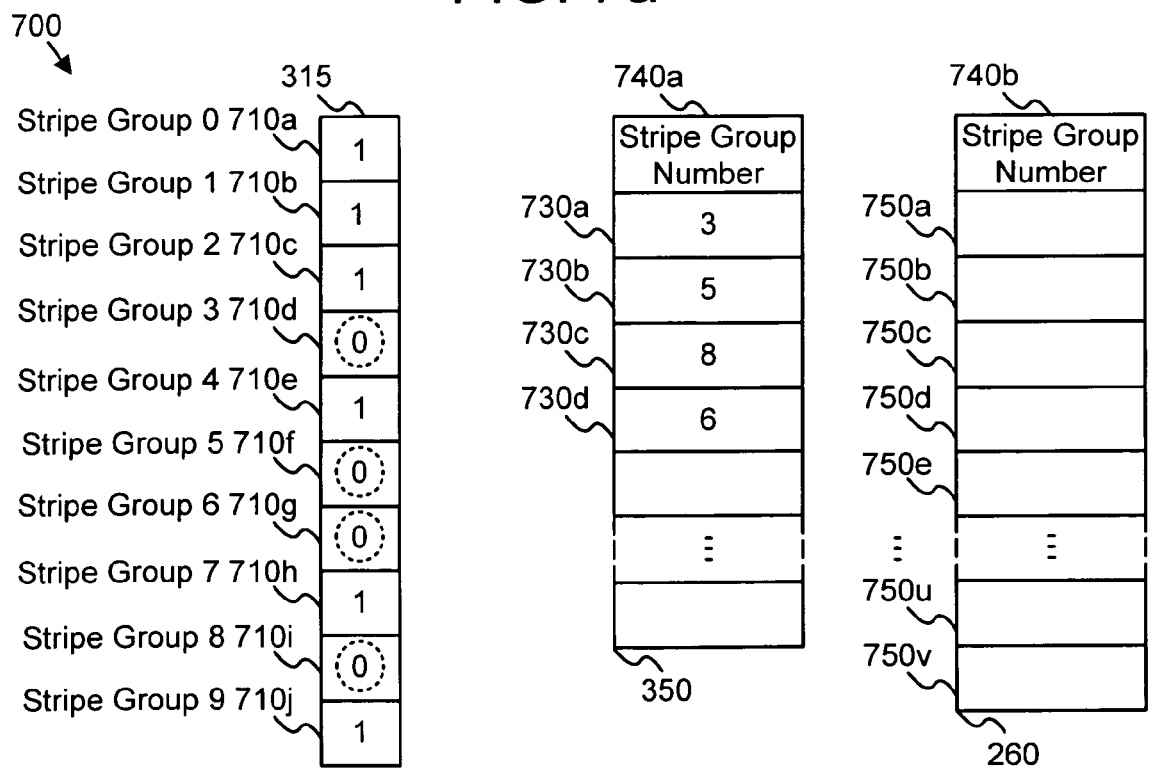

FIG. 7*b* depicts four occurrences of required stripe writing on the offline member disk 110 (not shown) at stripe group numbers 3, 5, 8, and 6 in sequence. The WIP map clear module 345 clears 410 four WIP map 315 entries to binary zeros (0s) for stripe group 3 710*d*, stripe group 5 710*f*, stripe group 6 710*g*, and stripe group 8 710*i*. The audit-trail log module 340 enters the appropriate stripe group numbers in the audit-trail log 740*a*; that is, number 3 in the first entry 730*a*, number 5 in the second entry 730*b*, number 8 in the third entry 730*c*, and number 6 in the fourth entry 730*d*.

Figure 7C:
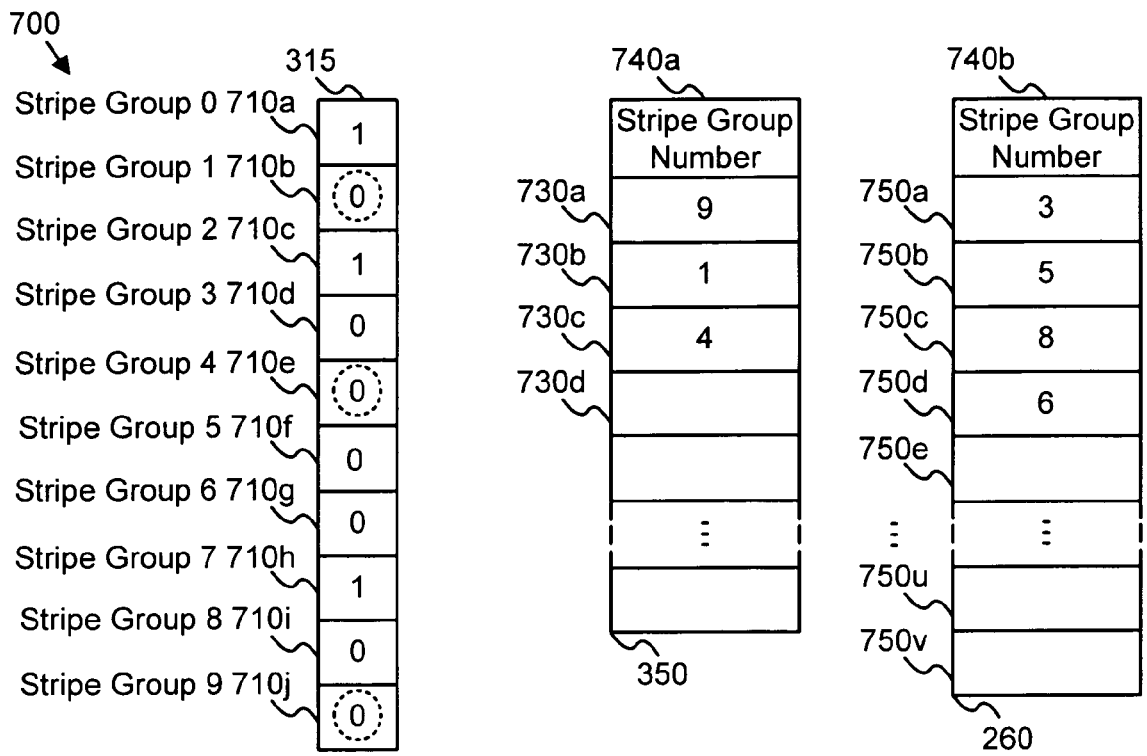

FIG. 7*c* illustrates three more occurrences of required stripe writing on the offline member disk 110 (not shown) at stripe group numbers 9, 1, and 4 in that order. The WIP map clear module 335 clears 410 entries of the WIP map 315 accordingly. As depicted, the audit-trail log module 340 has pushed contents of the audit-trail log 740*a* as shown in FIG. 7*b* onto the audit-trail log 740*b* and entered the new numbers, that is, 9, 1, and 4, into the audit-trail log 740*a*. Numbers 3, 5, 8, and 6 show up in entries 750*a*, 750*b*, 750*c*, and 750*d*, respectively, of the audit-trail log 740*b*. Numbers 9, 1, and 4 are shown in entries 730*a*, 730*b*, and 730*c*, respectively, of the audit-trail log 740*a*.

Figure 7D:
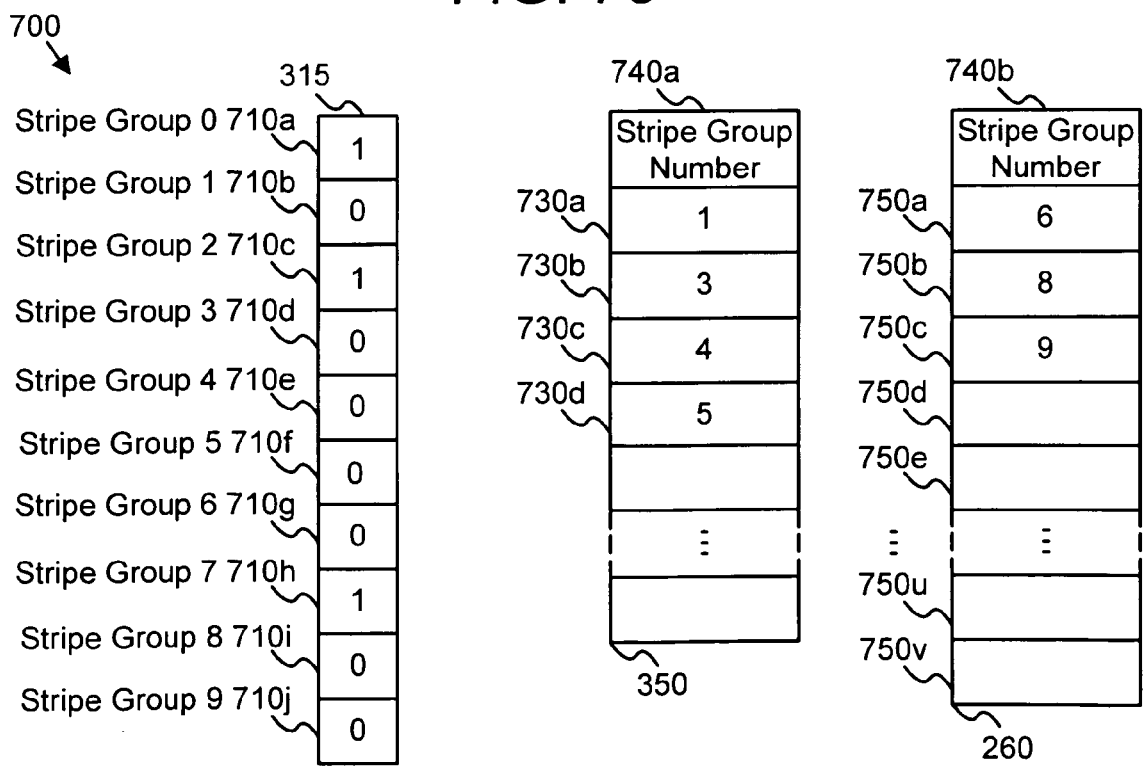

FIG. 7*d* depicts one embodiment of the audit-trail log entry reordering by the audit-trail log module 340, so that prior to the start of a DR process, the audit-trail log 740 entries in the non-volatile memory 350 and the fault-tolerant disk storage 260 contain numbers of stripe groups having a pending DR process in an ascending numerical order, which matches that of the WIP map 315 cleared entries when scanned top down. The reordering of audit-trail log 740 entries facilitates an updating of the audit-trail log 740 subsequent to a DR process. In an alternate embodiment, the stripe group selection module 330 selects 430 each stripe group according to the top-down order of the audit-trail log 740*a* entries as shown in FIG. 7*c*. Upon the completion of a DR process on all stripe groups listed in the audit-trail log 740*a*, the audit-trail log module 340 may bubble up entries in the audit-trail log 740*b* such as depicted in FIG. 7*c* into the audit-trail log 740*a*. The tracking of changed stripes 700 by use of the audit-trail log 740 aids in recovery of the WIP map 315 if invalidated inadvertently.

Figure 8A:
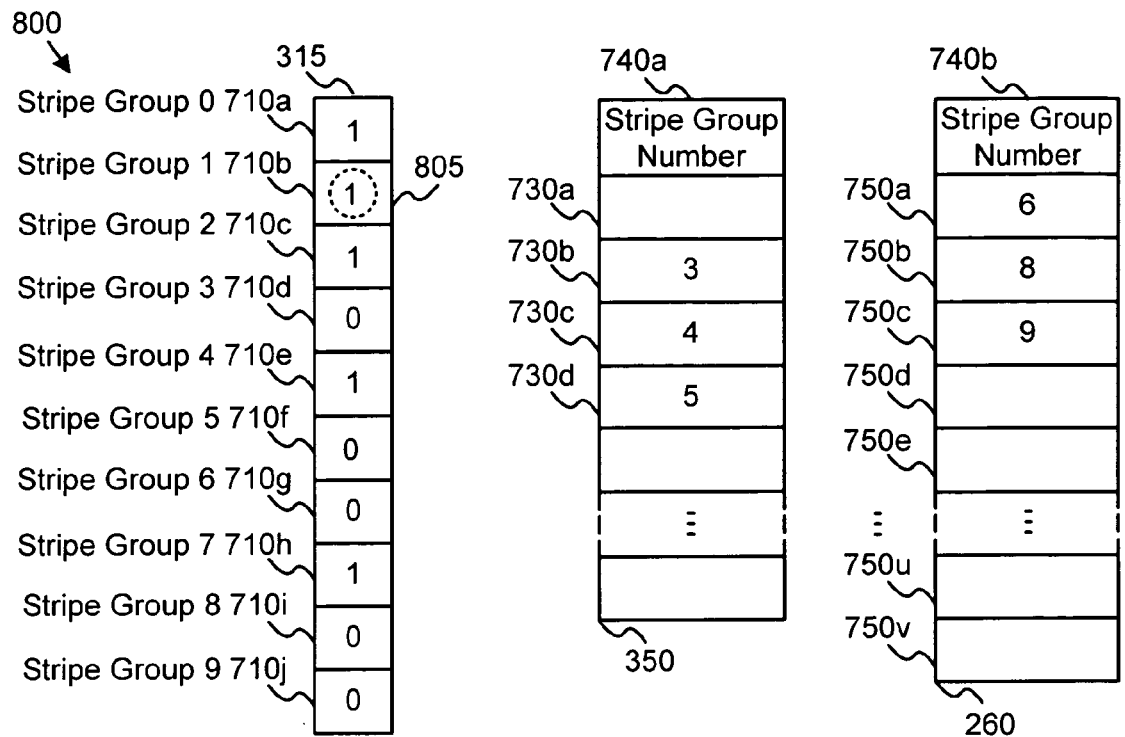
FIGS. 8a and 8b are schematic block diagrams illustrating one embodiment of an exemplary updating of the WIP map and the audit-trail log in accordance with the present invention.
Figure 8B:
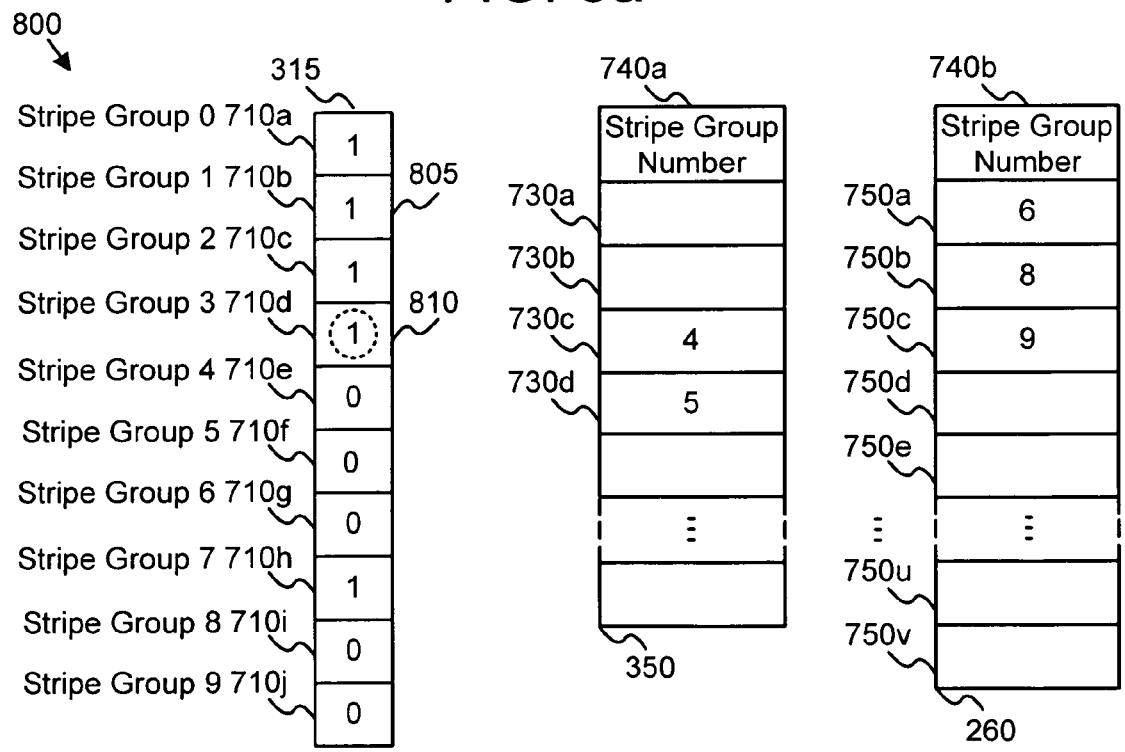

FIGS. 8*a* and 8*b* are schematic block diagrams illustrating one embodiment of an exemplary updating operation 800 of the WIP map 315 and the audit-trail log 740 in accordance with the present invention. Continuing from the exemplary tracking 700 of stripe groups each having a pending a DR process as shown in FIG. 7*d*, FIGS. 8*a* and 8*b* depicts the updating of the WIP map 315 and the audit-trail log 740 subsequent to a DR process on a stripe group. FIG. 8*a* shows that following a DR process on stripe group 1, the WIP map update module 345 sets the bit 805 of the WIP map 315 to a binary one (1) from the binary zero (0) as shown in FIG. 7*d*, and that the audit-trail log module 340 removes number 1 from entry 730*a* of the audit-trail log 740*a*. Likewise, FIG. 8*b* illustrate the updating of the WIP map 315 entry bit 810 and the entry 730*b* of the audit-trail log 740*a* subsequent to a DR process on stripe group 3. Note that until the audit-trail log 740*a* removes the last entry 730*d* as a result of a DR process, no contents of entries of the audit-trail log 740*b* are popped into the audit-trail log 740*a*. The updating operation 800 of the WIP map 315 and the audit-trail log 740 upon completing a DR process on a stripe group not only tracks the DR process completion status, but also enables a reconstruction of the WIP map 315 without duplicating the DR process on the stripe group if the reconstruction becomes necessary.

Figure 9A:
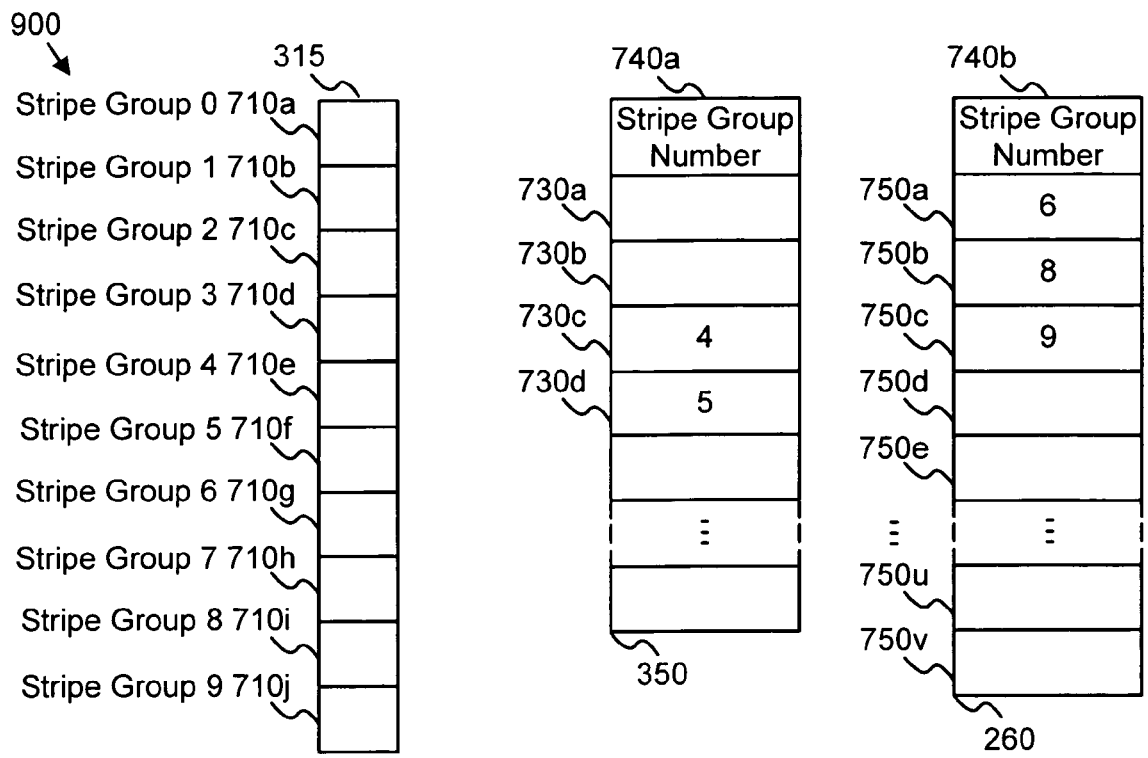
FIGS. 9a, 9b, and 9c are schematic block diagrams illustrating one embodiment of a WIP map recovery in accordance with the present invention.
Figure 9B:
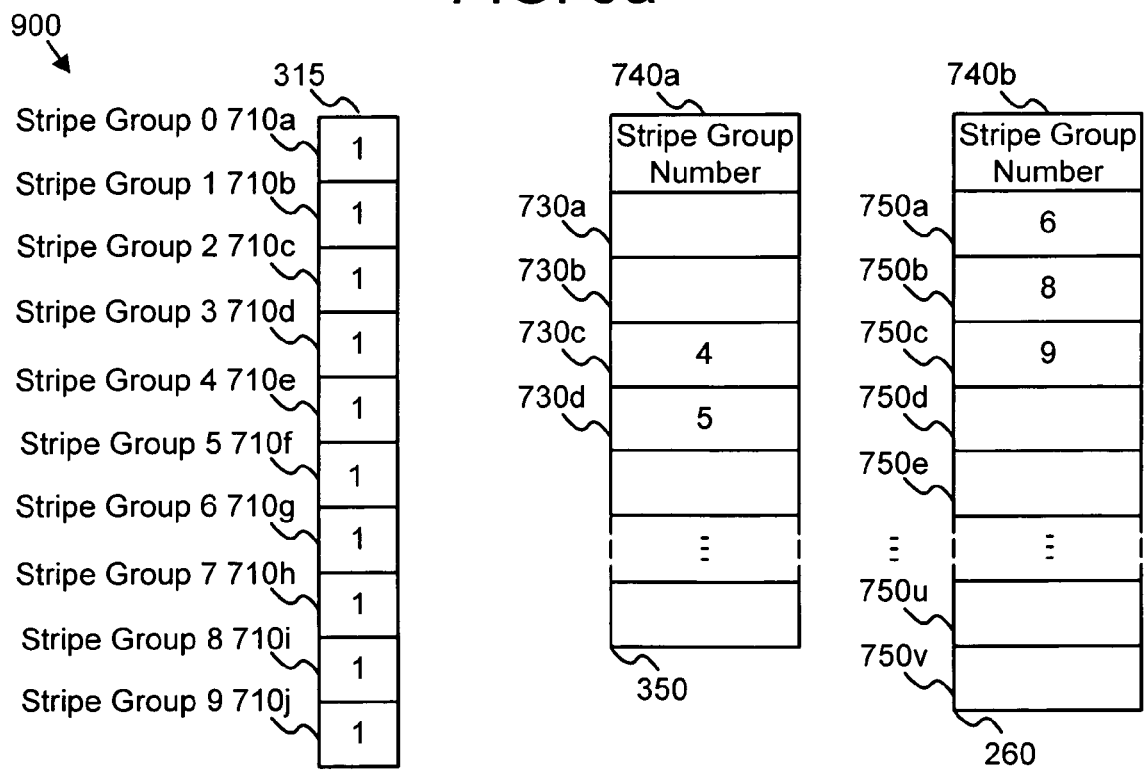
Figure 9C:
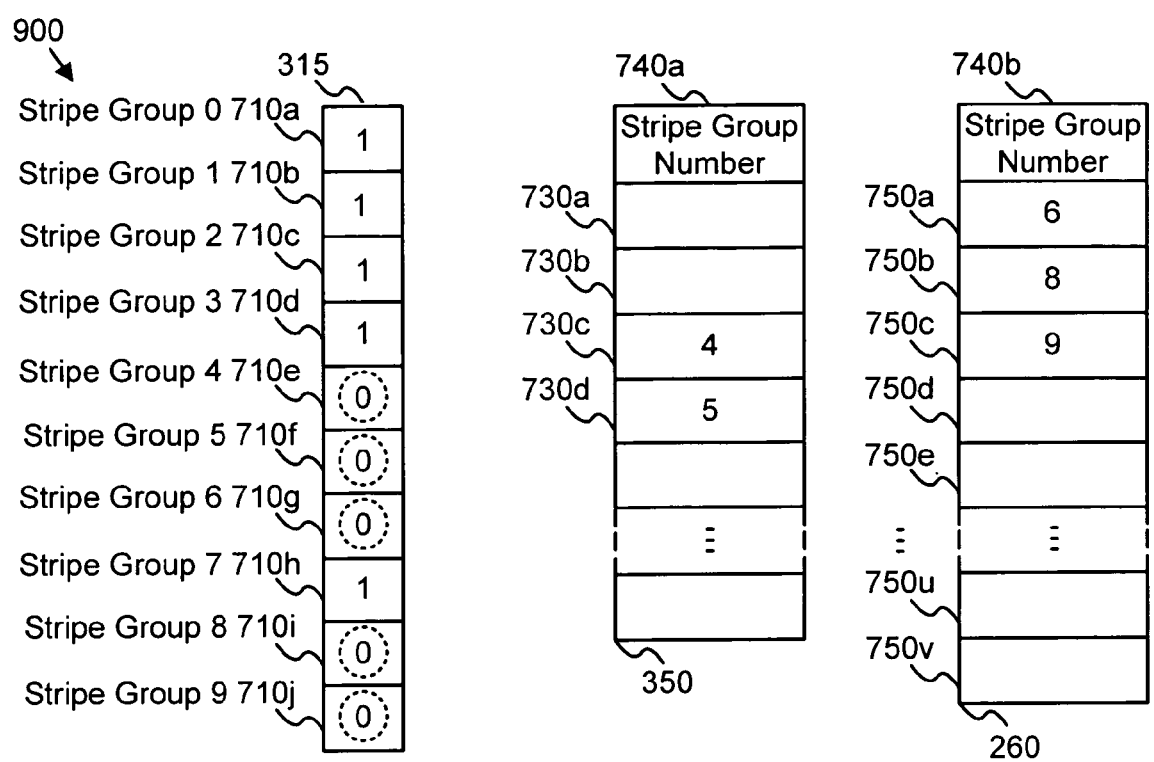

FIGS. 9*a*, 9*b*, and 9*c* are schematic block diagrams illustrating one embodiment of a WIP map recovery operation 900 in accordance with the present invention. If, for example, subsequent to the DR process on stripe group 3 in the example given in FIG. 8*b*, a power failure occurs. FIG. 9*a* depicts states of the WIP map 315 and audit-trail log 740 following the resumption of the power. As shown, the WIP map 315 has no record of a DR process pending on any stripe group. The audit-trail log 740*a* residing in the non-volatile memory 350 and the audit-trail log 740*b* residing in the fault-tolerance disk storage 260 have captured and retained DR process pending stripe group identifiers. The audit-trail log 740*a* contains stripe group numbers 4 and 5, and the audit-trail log 740*b*, stripe group numbers 6, 8, and 9.

As depicted in FIG. 9*b*, the WIP map initialization module 325 re-initializes 405 the WIP map 315. FIG. 9*c* illustrates that the WIP map clear module 335 re-clears 410 entries 710 of the WIP map 315, representing stripe groups numbered 4, 5, 6, 8, and 9 based on the contents of the audit-trail logs 740*a* and 740*b*. The WIP map recovery 900 reinstates the stripe groups that had a DR process pending by reconstructing the WIP map 315 as if no power failure had occurred.

The present invention utilizes a reconstructable WIP map 315 to track changed stripes of the offline member disk 110 prior to a reactivation and the completion of a DR process on stripe groups containing the stripes subsequent to the reactivation. In addition, the present invention shortens the duration of a degraded mode of operation of a logical drive 160 formed from a redundant RAID array 100*b*, 100*c* in the absence of a hot standby disk by reactivating the offline member disk 110 and rebuilding thereon only the changed stripes instead of each stripe regardless of whether changed or not. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for executing differential rebuilding ("DR"), the apparatus comprising:
   a work-in-process ("WIP") map for an offline member disk in a redundant RAID array with no hot standby disk configured with a plurality of WIP entries to track DR completion of each corresponding stripe group, each said entry being initially set;
   a WIP map clear module configured to clear a WIP map entry for a stripe group wherein the disk has an unfulfilled write requirement;
   an extended error recovery module configured to reactivate said disk and to detect a state change to online of said disk; and
   a DR performance module configured to perform DR on said disk following a successful reactivation at each stripe group with a cleared WIP map entry and subsequently set said entry.

2. The apparatus of claim 1, wherein the extended error recovery module reactivates the offline member disk using a device reset cycle and an automated selective device power cycle.

3. The apparatus of claim 1, wherein the offline member disk is configured to be manually reactivated to become online by removing and re-inserting said disk in said RAID array.

4. The apparatus of claim 1, wherein the extended error recovery module is further configured to designate the offline member disk as permanently offline if the offline member disk fails to become online within a pre-specified period of time.

5. The apparatus of claim 1, wherein if the extended error recovery module detects a replacement of the offline member disk by a hot swap disk bearing a new identity, the extended error recovery module makes the replacement disk undertake a full rebuilding on each stripe.

6. The apparatus of claim 1, further comprising an input/output ("I/O") module configured to execute an I/O command comprising a data block address of an active logical drive formed from said RAID array, access the data block if the logical drive is not in a degraded state, access the data block if the logical drive is in a degraded state, a rebuilding process is active, and the associated stripe group has no pending rebuilding process, delay access to the data block if the logical drive is in a degraded state, a rebuilding process is active, and the associated stripe group has a pending rebuilding process until the stripe group completes the rebuilding process, access the data block if the logical drive is in a degraded state, no rebuilding process is active, and the data block address is not mapped to the offline member disk, and regenerate data if the logical drive is in a degraded state, no rebuilding process is active, the data block address is mapped to the offline member disk, and the I/O command is a read command.

7. The apparatus of claim 6, wherein the I/O module is further configured to update any check data in the associated stripe group on a surviving member disk if required as a result of executing the I/O command.

8. The apparatus of claim 1, further comprising an audit-trail log module configured to record an audit-trail log as a log of the stripe group identifiers of WIP map cleared entries.

9. The apparatus of claim 8, wherein the audit-trail log module is further configured to reconstruct the WIP map from the audit-trail log.

10. The apparatus of claim 9, further comprising a non-volatile memory configured to store the audit-trail log.

11. The apparatus of claim 10, further comprising a fault-tolerant disk storage configured to receive and store a portion of the audit-trail log from the non-volatile memory.

12. The apparatus of claim 11, wherein the audit-trail log module is configured to reconstruct the WIP map from the audit-trail log stored in the non-volatile memory and the fault-tolerant disk storage.

13. A system for executing DR, the system comprising:
   a RAID array of member disks;
   a RAID enclosure housing the RAID array;
   a storage controller, coupled to the RAID array of member disks, the storage controller comprising:
      a processor;
      a memory coupled to the processor;
      a work-in-process ("WIP") map for an offline member disk in a redundant RAID array with no hot standby disk configured with a plurality of WIP entries to track DR completion of each corresponding stripe group, each said entry being initially set;
      a WIP map clear module configured to clear a WIP map entry for a stripe group wherein the disk has an unfulfilled write requirement;
      an extended error recovery module configured to reactivate the disk and to detect a state change to online of the disk; and
      a DR performance module configured to perform DR on the disk following a successful reactivation at each stripe group with a cleared WIP map entry and subsequently set said entry.

14. The system of claim 13, wherein the extended error recovery module reactivates the offline member disk using a device reset cycle and an automated selective device power cycle.

15. The system of claim 13, wherein the offline member disk is configured to be manually reactivated to become online by removing and re-inserting the disk in the enclosure of the RAID array.

16. The system of claim 13, wherein the extended error recovery module is further configured to designate the offline member disk as permanently offline if the offline member disk fails to become online within a pre-specified period of time.

17. The system of claim 13, wherein if the extended error recovery module detects a replacement of the offline member disk by a hot swap disk bearing a new identity, the extended error recovery module makes the replacement disk undertake a full rebuilding on each stripe.

18. The system of claim 13, wherein the storage controller further comprises an I/O module configured to execute an I/O command comprising a data block address of an active logical drive formed from the RAID array, access the data block if the logical drive is not in a degraded state, access the data block if the logical drive is in a degraded state, a rebuilding process is active, and the associated stripe group has no pending rebuilding process, delay access to the data block if the logical drive is in a degraded state, a rebuilding process is active, and the associated stripe group has a pending rebuilding process until the stripe group completes the rebuilding process, access the data block if the logical drive is in a degraded state, no rebuilding process is active, and the data block address is not mapped to the offline member disk, and regenerate data if the logical drive is in a degraded state, no rebuilding process is active, the data block address is mapped to the offline member disk, and the I/O command is a read command.

19. The system of claim 18, wherein the I/O module is further configured to update any check data in the associated stripe group on a surviving member disk if required as a result of executing the I/O command.

20. The system of claim 13, wherein the storage controller further comprises an audit-trail log module configured to record an audit-trail log as a log of the stripe group identifiers of WIP map cleared entries.

21. The system of claim 20, wherein the audit-trail log module is further configured to reconstruct the WIP map from the audit-trail log.

22. The system of claim 21, wherein the storage controller further comprises a non-volatile memory configured to store the audit-trail log.

23. The system of claim 22, further comprising a fault-tolerant disk storage configured to receive and store a portion of the audit-trail log from the non-volatile memory.

24. The system of claim 23, wherein the audit-trail log module is configured to reconstruct the WIP map from the audit-trail log stored in the non-volatile memory and the fault-tolerant disk storage.

25. A signal bearing medium tangibly embodying a program of machine-readable instructions executable by a digital processing apparatus to perform operations to execute DR, the operations comprising:
  creating a WIP map for an offline member disk in a redundant RAID array with no hot standby disk and setting each WIP map entry for an associated stripe group as initial condition;
  clearing the WIP map entry for a stripe group wherein the disk has an unfulfilled write requirement;
  reactivating the disk;
  detecting a state change to online of the disk; and
  performing DR on the successfully reactivated member disk at each stripe group with a cleared WIP map entry and subsequently setting said entry.

26. The signal bearing medium of claim 25, wherein the instructions further comprise operations to reactivate the offline member disk so as to make the disk online by initiating a device reset cycle and an automated selective device power cycle.

27. The signal bearing medium of claim 25, wherein the instructions further comprise operations to detect the state change to online from offline of the offline member disk subsequent to a manual reactivation.

28. The signal bearing medium of claim 25, wherein the instructions further comprise operations to designate the offline member disk as permanently offline if the disk fails to become online within a pre-specified period of time.

29. The signal bearing medium of claim 25, wherein the instructions further comprise operations to detect a replacement of the offline member disk by a hot swap disk bearing a new identity and to engage the replacement disk in a full rebuilding process on each stripe.

30. The signal bearing medium of claim 25, wherein the instructions further comprise operations to receive an I/O command comprising a data block address of an active logical drive formed from the RAID array, access the data block if the logical drive is not in a degraded state, access the data block if the logical drive is in a degraded state, a rebuilding process is active, and the associated stripe group has no pending rebuilding process, delay access to the data block if the logical drive is in a degraded state, a rebuilding process is active, and the associated stripe group has a pending rebuilding process until the stripe group completes the rebuilding process, access the data block if the logical drive is in a degraded state, no rebuilding process is active, and the data block address is not mapped to the offline member disk, and regenerate data if the logical drive is in a degraded state, no rebuilding process is active, the data block address is mapped to the offline member disk, and the I/O command is a read command.

31. The signal bearing medium of claim 30, wherein the instructions further comprise operations to update any check data in the associated stripe group on a surviving member disk if required as a result of executing the I/O command.

32. The signal bearing medium of claim 25, wherein the instructions further comprise operations to record an audit-trail log as a log of the stripe group identifiers of the WIP map cleared entries, and reconstruct the WIP map from the audit-trail log.

33. The signal bearing medium of claim 32, wherein the instructions further comprise operations to store the audit-trail log in a non-volatile memory.

34. The signal bearing medium of claim 33, wherein the instructions further comprise operations to receive and store a portion of the audit-trail log in a fault-tolerant disk storage from the non-volatile memory.

35. The signal bearing medium of claim 34, wherein the instructions further comprise operations to reconstruct the WIP map from the audit-trail log stored in the non-volatile memory and in the fault-tolerant disk storage.

36. A method for executing DR, the method comprising:
  creating a WIP map for an offline member disk in a redundant RAID array with no hot standby disk and setting each WIP map entry for an associated stripe group as initial condition;
  clearing the WIP map entry for a stripe group wherein the disk has an unfulfilled write requirement;
  reactivating the disk;
  detecting a state change to online of the disk; and
  performing DR on the successfully reactivated member disk at each stripe group with a cleared WIP map entry and subsequently setting said entry.

37. An apparatus for executing DR, the apparatus comprising:
  means for creating a WIP map for an offline member disk in a redundant RAID array with no hot standby disk and setting each WIP map entry for an associated stripe group as initial condition;
  means for clearing the WIP map entry for a stripe group wherein the disk has an unfulfilled write requirement;
  means for reactivating the disk;
  means for detecting a state change to online of the disk; and
  means for performing DR on the successfully reactivated member disk at each stripe group with a cleared WIP map entry and subsequently setting the entry.

* * * * *